United States Patent [19]

Clapp et al.

[11] Patent Number: 5,374,434
[45] Date of Patent: Dec. 20, 1994

[54] FOOD RELEASE COMPOSITIONS

[75] Inventors: Clarence P. Clapp; George S. Torrey, both of Danville, Ill.

[73] Assignee: Creative Products Inc. of Rossville, Rossville, Ill.

[21] Appl. No.: 787,193

[22] Filed: Nov. 4, 1991

[51] Int. Cl.$^5$ .............................. A23D 9/00; A23J 7/00
[52] U.S. Cl. .................................. 426/116; 426/609; 426/662; 426/811
[58] Field of Search ............... 426/115, 116, 609, 811, 426/662

[56] References Cited

U.S. PATENT DOCUMENTS

| | | | |
|---|---|---|---|
| 4,073,411 | 2/1978 | Doumani | 222/192 |
| 4,104,403 | 8/1978 | Barker et al. | |
| 4,155,770 | 5/1979 | Doumani | |
| 4,192,898 | 3/1980 | Hanson, Sr. | 426/250 |
| 4,339,465 | 7/1982 | Strouss et al. | |
| 4,371,451 | 2/1983 | Scotti et al. | 426/811 |
| 4,459,285 | 7/1984 | Grollier et al. | |
| 4,654,220 | 3/1987 | Heine et al. | 426/609 |

OTHER PUBLICATIONS

Schmidt, et al. Modified Lecithins, Chapter 10, pp. 203-211 of Lecithins, ed B. F. Szuhaj, et al., 1985.

*Primary Examiner*—Steven Weinstein
*Attorney, Agent, or Firm*—Victor E. Libert; Frederick A. Spaeth

[57] ABSTRACT

A parting composition for facilitating the release of foodstuffs from cooking utensils contains an edible oil, lecithin and water and, optionally, a humectant such as glycerol. The water is present in an amount sufficient to partially, but not fully, hydrate the lecithin so as to render the parially hydrated lecithin insoluble in the edible oil. The composition, which may further include a suitable normally gaseous propellant to discharge the composition from a conventional aerosol spray can, provides a substantially clear and smooth spray coating on cooking utensils at ambient temperatures, without the need for ethyl alcohol in the composition. The composition may optionally include conventional modifying agents such as suspending agents, antioxidants, preservatives, flavorants, etc.

23 Claims, No Drawings

FOOD RELEASE COMPOSITIONS

BACKGROUND OF THE INVENTION

1. Field of the Invention

The present invention relates to parting compositions for foodstuffs and, in particular, to lecithin/edible oil parting compositions which are free of monohydric aliphatic alcohols such as ethyl alcohol. The parting composition of the invention may be dispensed from conventional aerosol spray cans to provide a smooth, clear coating on the cooking surfaces of cooking utensils.

2. Background and Related Art

The prior art has devoted considerable effort to providing lecithin-containing food parting compositions which do not discolor foodstuffs or impart undesirable flavors to them, and which may be applied to the cooking surfaces of cooking utensils from a conventional pressurized aerosol dispenser in a clear, smooth, i.e., non-foaming, coating. The coating, which may be used in lieu of oils, grease, butter, etc. to lubricate the food-contacting surfaces of cooking utensils such as frying and baking pans, enhances separation of the cooked foodstuffs from the cooking surfaces. The use of lecithin is of course well known for this purpose and conventional food release compositions comprise a mixture of lecithin, a naturally-occurring substance usually derived from soybean oil, an edible oil and other known additives.

One approach taken by the prior art is to incorporate ethanol, i.e., ethyl alcohol, in a lecithin-vegetable oil mixture which is pressurized by a suitable propellant gas such as a hydrocarbon gas. This approach is exemplified in U.S. Pat. No. 4,188,412 of V. D. Sejpal, which provides for the inclusion of 7.5 to 25 percent by weight of ethyl alcohol (190° to 200° proof) in a lecithin-vegetable oil mixture which is pressurized by a hydrocarbon propellant for aerosol dispensing. This composition is stated to provide a suitably low viscosity for the mixture in a uniform, one-phase system, and renders even high concentrations of lecithin in the composition suitable for dispensing from aerosol containers in a clear, non-foaming manner. The ethyl alcohol is described as reducing the viscosity of the mixture and acting as an emulsifier (column 2, lines 11–32). The Patentee states that the stated limits for ethyl alcohol are critical to avoid undesirable foaming characteristics of the product and that 190° proof alcohol can be substituted for 200° proof alcohol. At the described critical range of 7.5 to 25 percent alcohol, the use of 190° proof alcohol will introduce 0.57 to 1.9 percent moisture into the composition. (See columns 11–12 of the Patent.)

U.S. Pat. No. 4,142,003 to Sejpal discloses non-aerosol vegetable oil compositions containing lecithin and 1 to 15 percent by weight ethyl alcohol. In TABLE 4 of the Patent, two sets of formulations comprising, variously, 3 or 12 percent lecithin, 82 or 73 percent soybean oil and 1 or 15 percent ethyl alcohol of from 50° to 190° proof are disclosed. The Patentee notes (column 4, lines 1-3) that 180° and lower proof alcohols cannot be utilized, presumably because of the resulting excess water content. TABLE 4 shows that use of lower proof alcohols results in separated, unclear products. At column 4, lines 7-33, the Patentee discloses upper limits for the amount of water introduced by the alcohol when 190° proof ethyl alcohol is used. The upper limit is given as about 0.60 percent by weight of water for a vegetable oil-ethyl alcohol formulation containing 12 percent by weight of lecithin, and about 0.4 percent by weight of water if the formulation contains 3 percent by weight of lecithin. The Patentee continues to note that "Within these critical limits, ethyl alcohol of somewhat less than 190° proof may be utilized in reduced amounts.". Because of these stringent upper limits on the amount of water which can be tolerated in the composition, the Patentee states that ". . . it is preferred that the ethyl alcohol be at least 190° proof.".

U.S. Pat. No. 4,163,676 issued to K. S. Konigsbacher discloses a pump-dispensable lecithin-based parting composition which comprises lecithin in an essentially anhydrous vehicle consisting essentially of a monohydric aliphatic alcohol having two or three carbon atoms, i.e., ethyl alcohol or propyl alcohol, and vegetable oil in proportions to provide a pump-sprayable consistency. This Patentee discloses that the presence of water tends to aggravate consistency problems and is desirably minimized in the composition to provide a maximum water content below that amount which forms a constant boiling mixture with the alcohol being used. (See column 1, line 59 to column 2, line 3 of the Patent.)

Another approach demonstrated in the prior art to attain the objective of a dispensable (by aerosol or otherwise) composition which provides a smooth, clear coating is to employ a water-in-oil emulsion of lecithin as exemplified in U.S. Pat. No. 3,896,975 to D. W. Follmer. Follmer discloses such a composition utilizing three major types of naturally-occurring lecithin so as to have a hydrophile-lipophile balance number ("HLB") of not more than seven. (The HLB number is defined at column 4, line 52 et seq of the Patent.) The water-in-oil emulsion of the Follmer Patent may also comprise so-called "edible detergents" (column 6, lines 56 through column 7, line 6). The "edible detergents" include glycerol monostearate, glycerol monooleate, propylene glycol monolaurate and polyethylene glycol fatty acid esters such as polyethylene glycol monolaurate, among others. The composition may be dispensed from a pressurized container through the use of a propellant (column 7, lines 7-23).

U.S. Pat. No. 3,661,605 issued to L. R. Rubin et al discloses an aqueous aerosol composition comprising a homogenized dispersion of hydroxylated lecithin in water. The Follmer Patent, described above, states at column 1, line 62 et seq that the use of hydroxylated, adulterated lecithin was resorted to in the Rubin et al Patent in order to obtain mixing of the lecithin with water adequate to prepare a water-based system. The Follmer Patent also states (column 1, line 41 et seq) that ". . . lecithin is uniquely effective, if not chemically adulterated as by hydroxylation to lose lubricity, because in addition to its lubrication qualities it is a naturally occurring material . . . ".

Other examples of water-in-oil/lecithin emulsions for use as food parting compositions include U.S. Pat. Nos. 4,073,411 and 4,073,412 to C. Doumani.

Another composition containing water as a major component is shown in Japanese Patent J5 4038-282 dated Mar. 22, 1979 which appears (from its English language Abstract) to disclose a scorch inhibitor comprising 6 to 55 percent edible oil, 1 to 48 percent lecithin, 40 to 94 percent water and 0.1 to 4 percent of a polyhydric alcohol, which together constitute the base preparation.

U.S. Pat. No. 4,371,451 to Scotti et al dated Feb. 1, 1983 discloses lecithin-containing surface release compositions comprising 7 to 60 percent water, 3 to 15 percent lecithin and 30 to 85 percent dimethylether, which serves as the propellant.

SUMMARY OF THE INVENTION

Generally, the present invention is predicated on the finding that a substantially clear, smooth lecithin and edible oil parting composition, suitable for being dispensed from a conventional aerosol can by a pressurized, normally gaseous propellant, may be attained without the use of foam-suppressing amounts, or any monohydric aliphatic alcohols, i.e., ethyl alcohol or propyl alcohol, and without the use of water-containing emulsions to provide a water emulsion system. This is attained by providing in an edible oil vehicle lecithin which has been partially hydrated to render it insoluble in the oil, with the degree of hydration being limited (by limiting the amount of added water) in order to control solubility in the oil of the resultant partially hydrated lecithin, and therefore the clarity and smoothness of the coating attained by dispensing the composition, e.g., by aerosol spray, onto cooking surfaces at ambient temperatures. This is attained in a non-emulsified composition which may be free of monohydric aliphatic alcohols and which nonetheless may be dispensed from a conventional pressurized aerosol can in a smooth, i.e., non-foaming, and substantially clear coating. The present invention therefore departs from the prior art concepts of either including a monohydric aliphatic alcohol, e.g., ethanol, in the lecithin-in-oil composition to control foaming and the like, or providing sufficient water to provide a water-in-oil or oil-in-water emulsion. The presence of a humectant such as a polyhydric alcohol such as glycerol has been found to enable the use of a broader range of water content. In one embodiment of the present invention, glycerol may be substituted for all of the added water. In any case, a reduced quantity of water in the composition is advantageous, as described more fully below. Conventional additives such as one or more of suspending agents, anti-oxidants, preservatives, flavorants and colorants may also be included in the composition.

Specifically, in accordance with the present invention there is provided an aerosol dispensable foodstuffs parting composition for coating cooking surfaces. The composition, which is free of foam-suppressing quantities of monohydric aliphatic alcohols, comprises a pressurized, normally gaseous propellant suitable for discharging the composition as an aerosol spray, and lecithin and water dispersed in an edible oil. The water is present in an amount which is sufficient to partially, but not fully hydrate the lecithin to an extent that solubility of the lecithin in the edible oil is sufficiently reduced so that aerosol-dispensed coatings of the composition are rendered non-foaming and clear at ambient temperatures.

In one aspect of the present invention, the lecithin has a known phosphatide content and the lecithin and water are present in amounts to provide a percent relative water content (calculated by dividing the weight of water in the composition by the sum of the weight of water plus phosphatides in the composition, and multiplying the result by 100), of from about 21 to 61 percent, e.g., from about 25 to 57 percent.

In various aspects of the invention, one or more of the following features are provided: the lecithin may comprise from about 1 to 25 percent by weight of the parting composition; the parting composition may further comprise a humectant selected from the group consisting of one or more of glycerol, sorbitol and propylene glycol, e.g., glycerol.

Yet another aspect of the present invention provides for inclusion in the parting composition of one or both of a suspending agent, e.g., fumed silica, present in an amount effective to facilitate suspension of the lecithin in the edible oil, and an edible preservative present in an amount effective to retard spoilage of the composition.

Another aspect of the present invention provides a foodstuffs parting composition which consists essentially of from about 1 to 25 percent by weight lecithin having a known phosphatide content, from about 0.2 to 22 percent by weight water, the lecithin and water being present in amounts to provide a percent relative water content (calculated by dividing the weight of water in the composition by the sum of the weight of water plus phosphateides in the composition, and multiplying the result by 100), of from about 21 to 61 percent, e.g., from about 25 to 57 percent. The composition also contains from about 98.7 to 53 percent by weight of edible oil. Optionally, this composition may also contain a propellant and one or more modifying agents.

Yet another aspect of the present invention provides a foodstuffs parting composition which comprises from about 1 to 25 percent by weight lecithin having a known phosphatide content, from about 0.1 to 18 percent by weight water, the lecithin and water being present in amounts to provide a percent relative water content (calculated by dividing the weight of water in the composition by the sum of the weight of water plus phosphatides in the composition, and multiplying the result by 100), of from about 21 to 61 percent, e.g., from about 25 to 57 percent. The composition also contains from about 98.7 to 53 percent by weight edible oil, and from about 0.2 to 19 percent by weight of a humectant selected from one or more of glycerol, sorbitol and propylene glycol. Optionally, this composition may also contain one or more modifying agents. The foodstuffs parting composition is dispersed by a propellant which is present in an amount to provide a non-foaming, clear coating when the composition is sprayed onto the cooking surface of a utensil.

In another aspect, the present invention also provides an aerosol-dispensable foodstuffs parting composition which is free of foam-suppressing quantities of monohydric aliphatic alcohols. This composition comprises from about 1 to 20 percent by weight of a lecithin component having a known phosphatide content, e.g., from about 4 to 15 percent by weight lecithin, optionally from about 0.2 to 17 percent by weight of a humectant selected from one or more of glycerol, sorbitol and propylene glycol, e.g., from about 1 to 9 percent by weight humectant, and water. The quantity of water in the composition is thus broadly, from about 0.2 to 22 percent by weight water. Preferably, the quantity of water is from about 0.3 to 18 percent water if the humectant is not present, and from about 0.1 to 11 percent by weight water if the humectant is present. In any case, the lecithin and water are present in amounts to provide a percent relative water content (calculated by dividing the weight of water in the composition by the sum of the weight of water plus phosphatides in the composition, and multiplying the result by 100), of from about 21 to 61 percent, e.g., from about 25 to 57 percent. The balance of the composition comprises an edible oil and from about 10 to 30 percent by weight of a pressurized, normally gaseous propellant suitable for discharging the composition as an aerosol spray.

In a related aspect of the invention, when the humectant is glycerol, lecithin and water are present in amounts to provide a percent humectant (glycerol) plus water relative to phosphatide content (calculated by dividing the weight of water plus humectant in the composition by the weight of water plus humectant plus phosphatides, and multiplying the result by 100, of from about 21 to 61 percent, preferably from about 25 to 57 percent.

Other, more specific aspects of the invention provide that the lecithin component may optionally comprise chemically modified or refined lecithins such as acetylated lecithin or hydroxylated lecithin, either as the sole lecithin component or in combination with standard lecithin. Therefore, the lecithin component may be selected from one or more of standard lecithin, acetylated lecithin and hydroxylated lecithin.

As used herein and in the claims, the term "percent by weight" used with reference to a particular component means the weight of that component in the composition divided by the total weight of the composition, including that of the particular component, with the result multiplied by 100.

As used herein and in the claims, the term "modified lecithin" refers to chemically modified lecithins, especially acetylated and hydroxylated lecithins. Reference herein and in the claims to "lecithin" is a broad term including standard lecithin and modified lecithin. The defined terms have the indicated meanings whether employed in the singular or plural forms. Further, unless specifically otherwise stated, all references in this specification and in the claims to amounts of "lecithin" or "lecithin component" whether expressed as percent by weight, or otherwise, refer to amounts of lecithin calculated as unhydrated lecithin. Thus, the amounts of lecithin are specified independently of water content, whether the water is present as free water or as water of hydration of the lecithin, or both.

Reference is made in the following description to the clarity of coatings obtained by dispersing a spray of the parting composition of the invention onto a surface. Such coatings may have objective clarity in that they have substantially the clarity of water, or they may have apparent clarity when sprayed on an opaque surface such as stainless steel even though, if sprayed upon a clear glass surface, they may display a very slight, albeit noticeable, haziness. It will be appreciated that apparent clarity is commercially acceptable inasmuch as, upon being applied as a spray coating to an opaque surface, it does not differ noticeably to the eye from a coating which has objective clarity. Therefore, spray coatings which are described as having slight haziness may nonetheless have apparent clarity when sprayed onto opaque surfaces and be commercially acceptable. Accordingly, as used in the claims, reference to a "clear" coating means and includes coatings which have either objective or at least apparent clarity.

Other aspects of the present invention are disclosed in the following detailed description of the invention and of certain embodiments thereof.

DETAILED DESCRIPTION OF THE INVENTION AND CERTAIN EMBODIMENTS THEREOF

The food parting or food release compositions of the present invention are useful for preventing sticking of cooked foodstuffs to the cooking utensils, thereby facilitating the removal of the foodstuffs from, and cleaning of, the cooking utensils. In a preferred embodiment, the parting composition is packaged in a conventional aerosol spray can including a suitable normally gaseous propellant for discharging an aerosol spray of the parting composition onto the food-contacting surfaces of cooking utensils. Other dispensing means such as hand-pumps or squeeze spray packages may of course be used. The spray coating produced by parting compositions according to the present invention are generally clear, i.e., transparent or translucent, and substantially free of foam. Reference below to "parting compositions" or "compositions", unless otherwise specified, will mean food release or parting compositions containing lecithin and edible oil.

Lecithin

Any suitable lecithin, including commercially available standard lecithins and modified lecithins, and combinations thereof, may be used in compositions according to this invention. Although lecithin is obtainable from both soybeans and from egg yolk, most commercially available lecithins are made from soybeans and are available both in liquid form, usually dissolved in soybean or other edible oil, or in dry powdered form. Food grade lecithins are typically obtained from soybeans by mixing soybean oil with water, which hydrates the lecithin and renders it substantially insoluble in the soybean oil, thereby permitting centrifugal separation of the hydrated lecithin from the oil. The separated lecithin may be dried to provide a lecithin powder or redissolved in a suitable edible oil to provide the lecithin in liquid form.

Lecithin is a complex mixture of acetone-insoluble phosphatides comprised mostly of phosphatidylcholine and lesser amounts of phosphatidylethanolamine and phosphatidylinositol. The lecithin is comprised of the phosphatides and varying amounts of other materials such as triglycerides, fatty acids and carbohydrates. Commercially available lecithins are available containing the above components in various combinations and proportions, usually containing from about 50 to 65 percent by weight of acetone-insolubles (phosphatides). In liquid form, the lecithin is usually dissolved in soybean oil and is available in different viscosities. The lecithin may be unbleached or, in order to lighten its color, it may be bleached, usually by peroxides, and may be filtered or otherwise refined. Such treatments do not chemically alter the phosphatide content of the lecithin and, as used herein and in the claims, the term "standard lecithin" means and includes any lecithin, whether crude, refined, filtered and/or bleached, provided that the lecithin, or at least the phosphatide content thereof, is not chemically modified by reaction of its functional groups.

Lecithin contains different functional groups that make it reactive in a number of chemical reactions. Chemically modified lecithins include lecithins which have been acetylated, hydroxylated, hydrolyzed, hydrogenated, halogenated, phosphorylated and sulfonated, among other treatments. However, insofar as significant quantities of commercially available chemically modified lecithins are concerned, only acetylated and hydroxylated lecithins are widely commercially available.

When mixed with water lecithin will become hydrated as discussed in detail elsewhere herein. Such hydrated lecithin is considered, and is defined herein, as a standard lecithin, that is, hydration of the lecithin is not considered to comprise chemical modification of it.

Edible Oil

Any suitable edible oil or mixture of edible oils may be used in formulations according to the present invention. Such oils include, by way of example and not by way of limitation, canola, partially hydrogenated winterized canola, corn, olive, peanut, cottonseed, safflower, partially hydrogenated winterized soy, and sunflower oils. The edible oil component of the invention generally constitute the largest single component of the food parting composition and serves as the vehicle for the lecithin, water and any other ingredients.

Propellant

Any suitable propellant acceptable for use in food products may be used in connection with the present invention. For example, by way of illustration and not limitation, conventional hydrocarbon propellants such as commercially available mixtures of butane, isobutane and propane are suitable, as are dimethyl ether, carbon dioxide, nitrous oxide and normally gaseous fluorocarbons. However, as environmental concerns grow and related emissions control standards become more stringent, it is advantageous to choose propellants from among those which are exempt from controlling regulations, such as regulations relating to Volatile Organic Compounds and promulgated by the Air Resources Board of the State of California, Stationary Source Division. Such exempt propellants include, by way of example, 1,1-difluoroethane (HFC-152a), trifluoromethane (HFC-23), and tetrafluoroethane (HFC-134a). Other acceptable although nonexempt propellants include, for example, propane, isobutane, n-butane, and mixtures thereof. The propellant, which may be present in the formulation as a pressurized gas, a liquified gas and/or a soluble gas dissolved in the liquid component of the composition, is present in an amount at least sufficient to facilitate the delivery of an acceptable quantity of the parting composition from a pressurizable container, i.e., from a conventional aerosol spray can. Typical proportions of propellant may range from about 10 to 75 percent by weight of the composition, and are preferably from about 15 to 50 percent by weight of the composition, although other quantities may be used.

Generally, liquifiable compressed gas propellants are hydrocarbons including propane, isobutane and n-butane, closely related dimethylether and fluorinated hydrocarbons such as difluoroethane (HFC-152), trifluoroethane (HFC-143B), tetrafluoroethane (HFC-134A), trifluoromethane (HFC-23) and mixtures thereof. The code numbers given in parentheses are product grades Used by E. I. DuPont de Nemours and Company, a manufacturer of fluorinated hydrocarbon gases. Gaseous propellants that are non-liquifiable gases under conditions of use in low pressure aerosol dispensers include carbon dioxide, nitrous oxide, nitrogen and other non-reactive gases whose boiling points are at or below about −100° F. These non-liquifiable gases would be limited to about not more than about 4 percent by weight of the formulations if packaged in conventional low pressure aerosol spray cans conventionally used for food release or parting composition products. Further, spray patterns with conventional and commercially utilized low pressure aerosol valves would be extremely poor. However, the provision of appropriate valves would permit suitable spray patterns with non-liquifiable gases used as the propellant. The propellants employed in all the Examples and referred to in all the TABLES of this application are liquifiable compressed gas propellants comprising hydrocarbons, i.e., propane, isobutane and n-butane or mixtures of two or more thereof. The quantities of propellant referred to in the claims are such hydrocarbon propellants.

Prior Art Parting Compositions Containing Alcohol

As noted above, coatings of lecithin and oil parting compositions, especially when dispensed by pressurized aerosol sprays, tend to form a foam on the surface of the cooking utensil at ambient temperatures unless certain expedients, such as the addition to the composition of ethyl alcohol, are employed. Such use of ethyl alcohol is taught by, among others, Sejpal U.S. Pat. No. 4,188,412 discussed above. Excessive or any significant foaming gives the coating an undesirable appearance and results in non-uniformity of the coating. However, the use of ethyl alcohol in parting formulations has certain disadvantages. Parting compositions containing alcohol (e.g., ethanol), lecithin and an edible oil usually present an initial foam when sprayed, the foam breaking and dissipating only subsequent to application to the cooking surface. Ethanol also has a characteristic odor not usually desired in parting compositions and is a costly ingredient. Further, the storage, use and handling of ethyl alcohol is subject to Government control and taxes, which contribute to increased costs, including accounting and record-keeping requirements. In addition, ethyl alcohol is a somewhat flammable and volatile organic composition which adds to the difficulties encountered in storage and handling of it.

Parting Compositions of the Present Invention

The practices of the present invention provide non-foaming, clear and smooth parting compositions, that is, food release compositions, having excellent release properties and which do not contain foam-suppressing quantities, or any, ethyl alcohol or any other monohydric aliphatic alcohol. Essentially, these excellent results are attained without the use of ethanol and without adding to the composition the quantities of water required to provide a water/oil (or oil/water) emulsion system. Such quantities of water in the composition present significant problems of release efficacy and appearance of white or opaque surface coatings.

Water Content

The amount of water added to the composition is selected so as to partially hydrate the lecithin or, more accurately, so as to partially hydrate the phosphatide portion of the lecithin so as to render the partially hydrated lecithin insoluble in the edible oil. (Reference herein and in the claims to hydration of the lecithin will be understood to refer to hydration of the phosphatide portion of the lecithin.) On the other hand, the amount of water added should not be so great as to fully hydrate the lecithin. Partially hydrated lecithins provide clear, amber colored, platelet-like materials of a viscosity which can be readily handled and dispensed through preferred means such as conventional aerosol spray cans. Insufficient water in the composition will not provide the desired degree of insolubility of the lecithin in oil to provide a readily dispersible non-foaming dispersion of lecithin in the oil. On the other hand, excessive water, in addition to contributing to problems of bacterial growth and rancidity as discussed below, will result in a milky or cloudy composition. Accordingly, in accordance with the practices of the present invention, the water content of the composition is from about 0.2 to 22 percent, preferably 0.3 to 18 percent, by weight water if no humectant is present and about 0.1 to 11 percent, preferably 0.1 to 9 percent, by weight water if a humectant is present. The humectant is preferably present in the amount of about 0.1 to 18 percent by weight, e.g., preferably about 0.2 to 15 percent by weight. Fully hydrated lecithins take on a golden yellow color but result in platelet-like globules of a very high, somewhat pasty, consistency. In accordance with the practices of the present invention, water is provided in the composition in an amount which will partially hydrate the phosphatide portion of the lecithin and render it into a somewhat (but not excessively) viscous, plastic-like material which is sufficiently insoluble in the edible oil so as to substantially eliminate foaming when the composition is sprayed onto a surface at ambient temperatures, and which is clear and transparent, or at least translucent.

The insoluble platelets of the partially hydrated lecithin are dispersed into the edible oil, and the degree of dispersion may be improved by size reduction of the platelets and the utilization of suspending agents such as fumed silica or other suitable suspending agents. Size reduction of the partially hydrated lecithin platelets may be attained by any suitable size reduction means. One convenient way to attain this size reduction for dispersion purposes is to utilize equipment of the type used for homogenization. Homogenization is conventionally attained by forcing the material to be homogenized at very high pressures through fine openings. Platelet size reduction, to attain better dispersion of the partially hydrolyzed lecithin throughout the edible oil may be accomplished by processing the mixture containing lecithin, water and edible oil in conventional homogenization equipment. Conceivably, other suitable techniques such as ultrasonic sound particle size reduction techniques could be utilized.

Generally, it is desirable to utilize as little water as possible consistent with attaining the desired non-foaming and clear characteristics of the composition. One reason for this is that the water activity of the composition is significant. The addition of even small amounts of water to the composition may result in a small amount of free water in equilibrium with the water of hydration of the lecithin. Different portions of the lecithin bond the water of hydration at different levels of bonding strength and a certain amount of free water will usually be present. However, the presence of free water provides a medium for bacterial growth, especially in systems which are exposed to air. Industrial grades of propellants such as normally gaseous hydrocarbons, are usually not entirely free of air. Further, residual portions of a parting composition containing significant water, for example, a portion left exposed in or adjacent the nozzle of an aerosol dispenser, provide a medium suitable for bacterial growth and hydrolysis of the edible oil content to fatty acids, resulting in undesirable flavors, spoilage and rancidity.

Humectants

It has been found that the amount of water utilized in the compositions in accordance with the present invention may be significantly reduced while yet attaining desirable viscosity, clarity and non-foaming characteristics of the coating by including in the composition a relatively minor amount of a humectant, which may be a polyhydric alcohol such as glycerol. As noted elsewhere herein, other polyhydric materials are also suitable as humectants, e.g., sorbitol and propylene glycol, but glycerol is the preferred humectant. Humectants, as that term is used in this application and the claims, are edible compositions which tend to sequester $H_2O$ molecules. Although a humectant is an optional constituent of the composition of the present invention, the presence of a suitable humectant such as glycerol is preferred and, in a given composition, can expand the range of water content, at the lower end of the range, while still providing smooth and clear coatings.

Thus, food parting compositions according to the present invention may optionally include a suitable humectant, e.g., up to about 4 percent by weight such as a polyhydric alcohol. It has been found, as will be discussed below, that the addition of such humectants enhances the foam-retarding effect of the limited amount of water present in the composition and, by reducing water activity of the composition, enhances resistance to spoilage. With the addition of a polyhydric alcohol humectant, preferably glycerol, compositions comprising less than 1.5 percent by weight water, e.g., as little as 0.1 or 0.2 percent by weight water, can provide a smooth, i.e., non-foaming, spray coating, and compositions containing significantly more water, e.g., up to about 22 percent by weight water, can provide clear coatings.

In addition, humectants such as glycerol change the texture of the suspended lecithin making it less viscous, thereby improving dispersion of the lecithin and stability of the parting compositions of the invention.

Suspending Agents

The parting compositions according to this invention are prepared as suspensions of the partially hydrated lecithin component in the edible oil component. Generally, suspending agents serve to maintain the partially hydrolyzed lecithin suspended in the edible oil vehicle. Thus, a suitable suspending agent added to the composition serves to stabilize the suspension of lecithin therein and to facilitate the resuspension of the lecithin after settling upon gentle shaking of the container by the user. The suspending agent should not affect the release properties of the composition to any significant degree, and should not clog the aerosol valve or orifice of the container. A variety of suspending agents was examined, including various stearates and silicates. A preferred suspending agent is colloidal silica, for example, precipitated silica or fumed silica. As will be seen below, fumed silica is the most preferred suspending agent, used at about 0.5 to 2 percent by weight of the composition. Fumed silica is commercially available from Cabot Corporation under the trademark Cab-O-Sil.

As discussed below, a preferred suspending agent is colloidal silica, which may comprise precipitated silica or, most preferably, fumed silica. However, other suspending agents may be employed alone or in combination with colloidal silica, and these include the stearates, palmitates and myristates of calcium, aluminum and magnesium. Generally, these compounds are less effective as suspending agents than colloidal silica but their use in the composition appears to enhance the release characteristics of the compositions. Thus, use of these materials, especially the stearates, in combination with colloidal silica as the suspending agent, provides a preferred aspect of the present invention as discussed in more detail below.

Modifying Agents

Any conventional modifying agents which do not adversely affect the non-foaming and clear coating characteristics of the composition may be included in the composition. Thus, as is known in the art, flavorants may be added to provide a desired flavor such as salt (sodium chloride), a butter flavor or the like, anti-oxidants may be added to retard oxidation of fatty acids and the like, and colorants may be added to provide a desired color to the composition although a clear, colorless composition is usually desired commercially. Preservatives such as calcium propionate, sorbic acid, potassium sorbate, sodium ethylene diamine tetracetic acid (sodium EDTA), sodium chloride, etc., may also be added to retard spoilage and rancidity. Modifying agents may also include viscosity-adjusting additions provided, however, that monohydric aliphatic alcohols in amounts which would have a foam-suppressing effect on aerosol-applied coatings of the parting composition are not used. (For example, the 7.5 to 25 percent by weight of ethyl alcohol of Sejpal U.S. Pat. No. 4,188,412, discussed above, in an aerosol-dispensable composition.) Such quantities of these alcohols, used by the prior art, are not required in the compositions of the present invention for foam suppression or clarity and have certain disadvantages as discussed in detail elsewhere herein. Consequently, such quantities of monohydric aliphatic alcohols are not considered for purposes of this description and the appended claims to be "modifying agents". If monohydric aliphatic alcohols were used at all in the compositions of the present invention, it would be in quantities of less than about 7.5 percent by weight, preferably less than about 1 percent by weight.

Preparation of the Parting Composition

The parting compositions of the invention may be prepared by any suitable technique. Generally, the lecithin and water are admixed, for example, a liquid lecithin comprising lecithin dissolved in soybean oil is admixed with water, resulting in the formation in the oil of platelets of partially hydrated lecithin. Size reduction of the platelets enhances the dispersing or suspending action on the platelets of suspending agents such as fumed silica. Such size reduction is conveniently carried out in homogenization equipment which forces the mixture of partially hydrated lecithin and edible oil under high pressure through very small openings to reduce the size of the platelets. Suitable homogenization equipment for such size reduction, at least on a laboratory scale, is a hand-operated homogenizer manufactured by Chase-Logeman Corporation of Hicksville, N.Y. This equipment can develop a maximum rated force of 1,000 pounds per square inch. Another suitable piece of homogenization equipment is a type KU1 homogenizer, manufactured by Erweka Apparatbau GmbH. This equipment, operated at full capacity at setting 1, will produce a force of 1,000 to 1,500 pounds per square inch. Another suitable piece of homogenization equipment is a two-stage homogenizer with a maximum operating pressure of 5,000 pounds per square inch, manufactured by APV Gaulin, Inc. of Wilmington, Mass.

A typical preparation of the parting compositions in accordance with the present invention is as follows. One-half the total edible oil to be used in the composition is added to an empty mixing vessel, followed by all of the formula lecithin with constant mixing as by a conventional motor-driven stirrer blade. When these two ingredients are uniformly mixed, a thoroughly mixed, uniform solution of all the formula water and humectant, e.g., glycerol, is added to the vessel, followed by addition of the formula amount of suspending agent, e.g., fumed silica. After uniform dispersion and mixing of all these ingredients is obtained, the remaining one-half of the formula edible oil is added and mixing is continued until the composition is uniform. The formulation is mixed continuously until platelet size reduction is carried out, e.g., in homogenization equipment at 1,000 to 3,000 p.s.i. After size reduction and before filling aerosol dispenser cans with the release composition, including a suitable propellant, mixing is continuously carried out in order to prevent separation of the partially hydrated lecithin. Neither the described method nor the order of addition of the ingredients is critical and other suitable techniques may be employed. For example, a mixture of the humectant, water, suspending agent, lecithin and a small portion of the edible oil may be mixed and homogenized and the homogenized mixture thereafter combined with the major portion of the oil, with mixing until the composition is uniform. Usually, preparation of the composition is carried out at ambient temperatures, generally from about 21° to 32° C. (70° to 90° F.), preferably at a temperature of from about 24° to 27° C. (75° to 80° F.). In some cases, depending on the particular formulation employed, continued or periodic mixing may be necessary to insure that all ingredients remain uniformly suspended and dispersed in the formulation. The skilled practitioner will be aware of suitable techniques which may be employed in order to attain the desired dispersion of lecithin and other ingredients in the edible oil.

All references in the TABLES and Examples below, or elsewhere herein, to "%" or "percent", mean percent by weight as defined above, unless otherwise specifically noted.

EXAMPLE 1

A variety of lecithin and edible oil formulations free of monohydric aliphatic alcohols were evaluated to determine the minimum amount of water necessary to produce a smooth, i.e., non-foaming, coating from an aerosol spray. These formulations were prepared with standard, acetylated and filtered and refined lecithins. In formulations comprising "standard" lecithin (i.e., lecithin having about 63 percent acetone-insolubles), lecithin constituted about 6 percent by weight of the compositions. If a processed or treated lecithin used in other formulations contained a different amount of acetone-insolubles, the weight percent of the treated lecithin in a given formulation was adjusted so that the acetone-insolubles content of all the formulation was remained constant, substantially the same as the formulations using standard lecithin. Each of the formulations of this Example 1 comprises 25 percent by weight propellant and various proportions of water ranging from zero to 6 percent water, the quantity of oil being adjusted to accommodate the different amounts of water, as follows:

| Formula | % Water | Formula | % Water | Formula | % Water |
|---------|---------|---------|---------|---------|---------|
| T2 19A | 0 | T2 20A | 0 | T2 25A | 0.5 |
| T2 19B | 0.5 | T2 20B | 0.5 | T2 25B | 1.0 |
| T2 19C | 1.0 | T2 20C | 1.0 | T2 25C | 1.5 |
| T2 19D | 1.5 | T2 20D | 1.5 | T2 25D | 2.0 |
| T2 19E | 2.0 | T2 20E | 2.0 | T2 25E | 4.0 |
| T2 19F | 4.0 | T2 20F | 4.0 | T2 25F | 5.0 |
| T2 19G | 5.0 | T2 20G | 5.0 | T2 25G | 6.0 |
| T2 19H | 6.0 | T2 20H | 6.0 | | |
| | | M3 143C | 2.5 | | |
| | | M3 143A | 3.0 | | |

-continued

| Formula | % Water | Formula | % Water | Formula | % Water |
|---------|---------|---------|---------|---------|---------|
|         |         | M3 143B | 3.5     |         |         |

The balance of the above compositions is canola oil. Each of the formulations was prepared following the preparation technique described above under "Preparation of the Parting Composition", and placed in pressurized containers. A coating of each composition was applied by aerosol spray onto a glass surface. The coating was then examined for foam or other irregularities and for clarity. The observations relating to smooth (i.e., non-foaming) coatings and clear or transparent as opposed to milky or foamy coatings, are recorded in TABLE I, PART A of which lists the clear, non-foaming coatings and PART B of which lists the foaming or milky coatings.

TABLE I

| Kind of lecithin. (% Range of acetone insolubles) | Acetone insulubles in formula % | Formulas | Water Content Range % |
|---|---|---|---|
| PART A. Clear, Non-Foaming Coatings ||||
| Standard (62-64) | 3.8 | T2 19D-H M3 143A-C | 1.5 to 6 |
| Acetylated heat-resistant (53-56) | 3.8 | T2 20D-H | 1.5 to 6 |
| Highly filtered, refined (50-54) | 3.7 | T2 25C-G | 1.5 to 6 |
| PART B. Foamy or Milky Coatings ||||
| Standard (62-64) | 3.8 | T2 19A-C | 0 to 1 |
| Acetylated heat-resistant (53-56) | 3.8 | T2 20A-C | 0 to 1 |
| Highly filtered, refined (50-54) | 3.8 | T2 25A, B | 0.5 to 1 |

The data of TABLE I show that, in general, formulations containing only lecithin (in an amount to provide about 3.8 percent phosphatides), oil, water, and propellant produce a clear, non-foaming coating when sprayed onto a cooking surface when the water content of the formulation is at least about 1.5 percent by weight but not more than about 6 percent by weight. The results attained by these formulations are shown in PART A of TABLE I. When these water-containing formulations containing more than about 6 percent by weight water were sprayed onto a transparent glass surface, the resultant coatings were either foamy or showed a slight milky (opaque) appearance as shown by the formulas grouped under PART B of TABLE I. An approximate range of water content of from about 1.5 to 6 percent by weight in a composition containing up to about 3.8 percent by weight phosphatides achieves an aerosol spray-applied coating which is both free of foam and transparent according to the embodiment of the present invention which does not contain a humectant. Since the present invention teaches that the amount of water to be used should be enough to partially, but not fully, hydrate the phosphatides content of the formulation, the permissible upper limit on the quantity of water added to the formulation increases as the amount of the lecithin phosphatides content in the formulation increases. Only a few of the formulations of TABLE I produced slightly milky but smooth coatings, all the other formulations producing substantially clear, smooth coatings. As demonstrated below, a broader range of water may be employed while still obtaining foam-free and clear aerosol-applied coatings, by the addition of a suitable humectant to the formulation. The data of TABLE I also demonstrate the utilization in the formulations of three different commercially available types of lecithin in amounts to provide a constant acetone-insolubles content.

The lecithin, oil and water contents of the formulations according to the present invention are easily combined into a stable suspension which, if separation of phases does occur in prolonged storage, is easily resuspended.

EXAMPLE 2

To determine whether a given formulation results in a satisfactory suspension of the partially hydrated lecithin in the edible oil, a number of formulations, including propellant, were prepared and deposited into pressure-resistant glass bottles fitted with appropriate aerosol valves. The use of glass, rather than standard steel aerosol cans, allows viewing of the composition within the container to evaluate suspension, settling and resuspension. To enhance the suspension characteristics of the formulations, in each case a portion of the standard lecithin component was replaced with hydroxylated lecithin, which is more miscible in water than standard lecithin. The formulations set forth in Part A of TABLE II contain the stated amounts of lecithin, 1.5 percent by weight water, 25 percent by weight propellant, and, for those formulations which contain a suspending agent, 1 percent by weight of fumed silica sold by Cabot Corporation under the trademark Cab-O-Sil, the balance of each formulation being winterized canola oil.

TABLE II

| | | PART A ||||
| | | Amounts (%) of Lecithin || Total Acetone-insol. % | Suspending Agent |
| No. | Type* | Total | Hydroxylated | | |
|---|---|---|---|---|---|
| 1 | Standard | 6.0 | 0.0 | 3.8 | Yes |
| 2 | " | 4.0 | 2.0 | 3.8 | No |
| 3 | " | 3.0 | 3.0 | 3.8 | No |
| 4 | " | 2.0 | 4.0 | 3.8 | No |
| 5 | Acetylated | 6.0 | 0.0 | 3.3 | Yes |
| 6 | " | 4.0 | 2.0 | 3.4 | No |
| 7 | " | 3.0 | 3.0 | 3.5 | No |
| 8 | " | 2.0 | 4.0 | 3.6 | No |
| 9 | Filtered | 6.0 | 0.0 | 3.1 | Yes |
| 10 | " | 4.0 | 2.0 | 3.3 | No |
| 11 | " | 3.0 | 3.0 | 3.4 | No |
| 12 | " | 2.0 | 4.0 | 3.5 | No |
| 13 | Hydroxylated | 0.0 | 6.0 | 3.7 | No |
| 14 | " | 0.0 | 6.0 | 3.7 | Yes |

*Type = type of lecithin which is combined with the hydroxylated lecithin.

The spray coating characteristics of the hydroxylated lecithin-containing formulations of PART A of TABLE II, as well as their suspension and re-suspension properties are set forth below in PART B of TABLE II.

PART B

Suspension and Coating Characteristics of the Formulations of Part A

The formulations were sprayed onto a glass sheet and the resultant coatings were observed. The descriptive terms used to describe the resulting coatings are as follows: "foam" means that the coating contained numerous small, stable bubbles; "bubbles" means that the coating contained large bubbles that break within 15 to 30 seconds after spraying; "latent bubbles" means that the coating contained small bubbles that form after spray application; "smooth" means that the coating contained no irregularities on the sprayed surface; "clear" means that the coating was transparent; "milky" means that the coating was slightly white and translucent. Generally, commercially acceptable spray coatings, although ideally clear and smooth, include coatings which contain very few, relatively large bubbles and/or show a very slight milkiness. (The latter is "apparent clarity" as discussed above.) The following results were observed.

| No. | Coating Description |
|---|---|
| 1, 5–9, 12–14 | smooth, clear |
| 2 | bubbles, clear |
| 3, 4, 10, 11 | latent bubbles, clear |

The formulations of PART A were allowed to stand for at least forty-eight hours. Separation within 2 to 5 minutes of the partially hydrated lecithin was noted in those formulations which did not contain a suspending agent and separation within about 15 minutes to two hours was noted for those formulations which contained the suspending agent. After separation did occur, the bottles were shaken to determine if resuspension of the lecithin in the oil would take place, and the following results were observed.

| No. | Resuspension |
|---|---|
| 1, 4, 5, 8–11, 14 | Resuspends easily |
| 2, 13 | Resuspends difficulty |
| 3, 6, 7 | Resuspends, particulates |
| 12 | Does not resuspend |

The data of TABLE II show that combinations of hydroxylated lecithin with standard, acetylated and filtered lecithins produced clear spray coatings, some of which were smooth, and all the formulations containing acetylated lecithin produced clear and smooth spray coatings. Formulations Nos. 2 and 13 resuspended with difficulty and formulation 12 did not resuspend.

It should be noted that each of the formulations of Example 2 contains only the minimum 1.5 percent by weight water for formulations which contain about 3.1 to 3.8 percent by weight acetone-insolubles (phosphatides) and contain no humectant. As indicated by some of the data discussed below, formulations utilizing slightly higher water levels, such as 2 percent, provided even better results with respect to obtaining smooth, clear aerosol spray-applied coatings. For example, see TABLE VIII below.

EXAMPLE 3

A variety of formulations were prepared with varying proportions of lecithin component to determine whether variations in lecithin content affected the minimum amount of water needed to prevent foaming. Without wishing to be bound by any particular theory, it is hypothesized, as described above, that foaming is inhibited when the phosphatide portion of lecithin is partially hydrated to a certain degree, less than fully hydrated. It is believed that small amounts of water serve to hydrate the phosphatide portion of lecithin and have a beneficial effect on the foaming characteristic of spray coatings of the composition as well as affecting the clarity of the composition.

The following discussion attempts to correlate lecithin hydration with non-foaming and transparency features of aerosol-spray coatings of parting composition formulations.

Phosphatidylcholine and lesser amounts of other phosphatides comprise a principal component of lecithin. These phosphatides are hydrated by water and the degree of such hydration is believed to determine the unique non-foaming (smooth) and clear (transparent) characteristics of the spray coatings which are the subject of this invention. Phosphatidylcholine is a water insoluble, Class II, polar lipid that is capable of forming liquid crystalline phases. Molecular phosphatidylcholine swells when water contacts the hydrophilic, zwitterionic phosphatidylcholine portion of the molecule even though the diacylglycerol portion of the lecithin molecule is hydrophobic. At very low concentrations of water, phosphatidylcholine has a crystalline form hydrated with 1 or 2 water molecules per molecule of phosphatidylcholine. In this form, phosphatidylcholine is in a mono- or dihydrate crystalline form with water tightly bound thereto. Apparently, when crystalline lecithin is incorporated into an aerosol pan spray, the resultant spray coating foams excessively and the foam interferes with performance of the product.

As the crystalline phosphatidylcholine contacts additional small amounts of water, it swells and forms a fluid, clear phase. Formation of chain-like, lamellar liquid crystals seems to accompany increasing hydration. At low concentrations of water both crystalline and lamellar forms of phosphatidylcholine appear to coexist. The combination of these hydrated forms in the proper ratio is believed to provide both (1) the clear lecithin phase and (2) the lamellar bilayer responsible for the transparent and non-foaming spray coat, respectively. As the water content of the lecithin increases, tightly bound water increases to a maximum of 9 to 13 molecules per phosphatidylcholine molecule. The hydrophilic, zwitterionic head portion of the phosphatidylcholine molecule containing choline and phosphoric acid may continue to take on water molecules which are less tightly bound, or "free", and may continue to swell until a maximum degree of hydration is reached somewhere between about 22 to 29 total water molecules. Discussions of the hydration of phosphatidylcholine can be found in the following references, the disclosures of each of which are incorporated by reference herein. Small, D. M. 1986, *Handbook of Lipid Research*, Volume 4; *The Physical Chemistry of Lipids*, Plenum Press. N.Y.; and Szuhaj, B. F. and G. R. List, 1985, *Lecithins* (AOCS Monograph 12), Amer. Oil Chemist's Soc., Champaign, Ill.

Charged phosphatides which may be present in lecithin, including phosphatidylethanolamine and phosphatidylinositol, undergo hydration (in the phosphate region) as well, but to a lesser extent than does phosphatidylcholine.

Since the data of TABLE III below suggest that the relationship between the amount of water and the amount of phosphatidylcholine in the parting composition is a dominant factor in determining the appearance of spray coatings according to this invention, it will be convenient to define a measure of water content relative to the phosphatide content of the formulation. This will take into account the somewhat differing phosphatide content of different lecithins. This measure is thus defined as the weight of water in the formulation divided by the total weight of water and phosphatides in the formulation, multiplied by 100. Such measure of water content will be given herein and in the claims as "percent relative water content" abbreviated as "percent RWC" and may be expressed as a mathematical formula, as follows:

$$\text{Percent } RWC = \frac{\text{weight of water}}{\text{weight of (water + phosphatides)}} \times 100 \quad \text{(I)}$$

The value of percent relative water depends only on the respective relative weights of water and total phosphatides in the compositions, and is wholly independent of what proportions water and phosphatides constitute with respect to the formulation as a whole.

Typically, the phosphatide content of the composition will be calculated from the measured lecithin content, phosphatides being taken as a fraction of the lecithin content (typically, phosphatides comprise about 63 percent of standard lecithin; other modified lecithins vary in phosphatide content as disclosed elsewhere herein). According to formula (I), 9 molecules of water per molecule of phosphatidylcholine is equivalent to 17.4 percent RWC. As stated above, the hydrophilic zwitterionic head portion of the phosphatidylcholine molecule swells with increasing hydration until a maximum hydration is reached somewhere between about 33.9 to 40.3 percent RWC.

By way of illustration, in a cooking spray formulated with 6 percent lecithin having 63 percent phosphatides, the minimum effective amount of added water needed to achieve a transparent, smooth, foamless spray coating would be about 1.5 percent, i.e., 28.4 percent RWC where the propellant level is about 25 percent by weight. For the same cooking spray formulation having 6 percent lecithin, the maximum water content to produce a transparent spray coating would be about 5 to 6 percent, i.e., about 57 to 61 percent RWC. This information is derivable from TABLE I, and is restated here to correlate the data of TABLE I with the discussion relating to lecithin hydration. Above the range of 5 to 6 percent water in the formulation, which corresponds to 57 to 61 percent RWC in this example, an undesirable milkiness appears in the non-foaming spray coating as a consequence of hydration of lecithin.

Commercial lecithins normally contain less than 0.1 percent by weight water. This amount is insufficient for the degree of lecithin hydration required to obtain the non-foaming characteristic of spray coatings. Such commercial lecithins are clear and flowable and have an amber color and may be dispersed in oil, without settling, in the absence of added water.

A series of formulations was prepared containing lecithin and water in the amounts indicated in TABLE III below, 25 percent propellant and the balance comprising winterized canola oil.

TABLE III

This TABLE III shows the influence on spray coating characteristics of the water-phosphatide relationship expressed as percent RWC in formulations containing various amounts of water and standard lecithin and propellant in the amount of 25 percent. It should be noted that at increased amounts of propellant (not represented in the data of TABLE III) smooth and clear coatings were produced at % RWC values as low as 21 percent. Percentages by weight are shown in TABLE III as "%". The composition and coating characteristics of formulations T2 40A through M are

| % Lecithin | % Water | % RWC | Coating Characteristics[1] |
|---|---|---|---|
| 2 | 0.5 | 28.4 | Smooth, clear |
| 4 | 0.5 | 16.6 | Foam |
| 4 | 1.0 | 24.4 | Smooth, clear |
| 6 | 0.5 | 11.7 | Foam |
| 6 | 1.0 | 20.9 | Foam |
| 8 | 1.0 | 16.6 | Foam |
| 8 | 2.0 | 28.4 | Smooth, clear |
| 10 | 1.0 | 13.7 | Foam |
| 12 | 1.0 | 11.7 | Foam |
| 12 | 2.0 | 20.9 | Bubbles |
| 12 | 3.0 | 28.4 | Clear |
| 14 | 3.0 | 25.4 | Slight Foam |
| 18 | 3.0 | 20.9 | Foam |

[1]See Part B OF TABLE II for descriptive terms used to characterize sprays. Spray coating indentified as smooth in this TABLE were also transparent; spray coatings that foamed were not evaluated for transparency.

TABLE III correlates observations of spray coatings from formulations having various percentages of lecithin and water, and presents with each observation the amount of water stated as percent RWC. TABLE III thus provides a means for relating the spray coating observations to the relative proportions of water to phosphatides, irrespective of their quantities as percentages of the respective formulations as a whole. Water and lecithin contents presented in TABLE III range from 0.5 to 3.0 and from 2 to 18 percent by weight, of the various formulations, respectively. The data and descriptions of TABLE III show that clear, non-foaming parting composition sprays containing standard lecithin were produced when the percent RWC is at least about 21, preferably, at least about 21 to 25, which corresponds to a weight ratio of lecithin to water of 2.9:1 to 2.5:1. These values are slightly smaller than the concentration of water at which phosphatidylcholine hydration reaches the final stage of molecular swelling described above. The smooth, clear character continues until the relative water and phosphatides content reaches about 61 percent RWC, preferably, about 57 to 61 percent RWC.

For purposes of illustration, if a food release spray formulation contains 6 percent by weight of lecithins which comprise 63 percent by weight phosphatides ($6\% \times 63\%$ = about 3.8 percent phosphatides in the composition), the minimum effective range for added water to achieve a transparent, smooth and foamless aerosol spray coating would be about 1.0 to 1.3 percent by weight water, equivalent to about 21 to 25 percent RWC. The maximum water content for such formulation to produce a transparent aerosol spray coating would be about 5 to 6 percent by weight water, equivalent to about 57 to 61 percent RWC. In this regard, see the data of TABLE I above. Above about 61 percent RWC, an undesirable haze or opaqueness begins to appear in the non-foaming spray coating which haze is, as described above, believed to be a consequence of excessive hydration of the lecithin. To summarize, a percent RWC of at least about 21 provides a spray coating which is acceptably free of foam and a percent RWC of not more than about 61 provides a spray-coating which is acceptably clear. If the absolute amount of phosphatides increases, the absolute amount of water may be increased, in order to keep within the range of from about 21 to 61 percent RWC, preferably from about 25 to 57 percent RWC. However, it must be recognized that many other factors affect the foaming or non-foaming characteristics of a particular composition. These include the droplet size of the spray, larger droplets favoring formation of foam because the greater volume-to-surface area ratio of larger droplets requires more solublized propellant break through the surface of the spray-coating, thereby increasing the tendency to foaming. Droplet size is affected by the valve design, especially the orifice configuration, and the mechanical break-up efficiency of the valve. Other factors include the propellant content, the propellant composition (because different vapor pressures and propellant densities affect foaming characteristics), the temperature, viscosity and the composition of the formulation being sprayed, (type of oil, quantity of lecithin, quantity of suspending agent, etc.). Further, the thickness of the sprayed-on coating applied to the surface being sprayed plays a role in the degree of foaming or whether or not foaming occurs. Thus, the spray rate, the distance between the nozzle and the surface on which spraying takes place, the temperature and type of surface being sprayed upon, the distance of the spray can from the surface and other such factors. Generally, thinner sprayed-on coatings suffer less from foaming than do thicker coatings. Nonetheless, given that the degree of foaming is affected by such factors, the present invention provides guidance to the skilled practitioner in the provision of a food release composition, i.e., a parting composition for cooked foods, wherein foaming may be significantly reduced or eliminated in compositions which are substantially free of foam-suppressing amounts of monohydric aliphatic alcohols.

EXAMPLE 4

Although improved suspensions were achieved with the addition of hydroxylated lecithin, it may be preferred to use optional additives to improve the stability of the suspensions. A variety of suspending agents was added in an amount equal to 1 percent by weight of formulations otherwise comprising 6 percent standard lecithin, 2 percent water, 25 percent propellant and balance (66 percent) canola oil (all percents are percent by weight). The results of these evaluations of suspension stability and spray coating characteristics are set forth in TABLE IV under the respective subheadings "Lecithin Suspension Characteristics" and "Spray Coating Characteristics". In addition, TABLE IV (and TABLES V and VIII) record the release characteristics of the parting compositions. The release characteristics were evaluated by calculating an average release value obtained for blueberry muffins and cupcakes baked in muffin pans spray-coated with the various parting compositions prior to the batter being deposited therein.

Each composition was tested twice by spraying it onto a clean aluminum muffin pan having twelve individual cavities measuring one and seven eighths inches, equivalent to 4.763 centimeters ("cm") in diameter at the top, one and one-quarter inches (3.175 cm) in diameter at the bottom and three-quarters of an inch (1.905 cm) in depth. The various formulations were applied to the pan by spraying in a circular fashion to favor the deposition of a uniform coating on the pan surface. In one test the pan was then filled with batter prepared from a JIFFY brand blueberry muffin mix and in another with batter prepared from a JIFFY brand white cake mix. The muffin and cake batters were prepared according to the instructions on the box with the exception that the blueberry muffin mix was altered by addition of ½ teaspoon powdered buttermilk and one large egg, and by deleting all milk while adding ¼ cup of water. The cake mix was altered by the addition of one large egg. In each test approximately the same amount of batter was spooned into each cavity of the pan. Once the pan was filled with batter, it was placed in an oven preheated to 350° F. The muffins were baked at this temperature for fifteen minutes, the cupcakes for twenty minutes. In each case, after the baking period, the pans were removed and allowed to cool for five minutes at room temperature. The pans were then inverted to an upside down position to see if any of the muffins or cupcakes fell out, and the results were noted. While inverted, the pan was shaken once to see if additional cupcakes or muffins fell out and the results were noted. The shakes were repeated one at a time until the upside down pan was subjected to ten shakes and the number of cakes or muffins that fell out in each shake was recorded. At the end of ten shakes it was noted how many cupcakes or muffins, if any, remained in the pan.

The observations made during the shake procedure were quantified by assessing "points" according to the total number of shakes required to dislodge the cakes or muffins as follows. For each cake or muffin which fell out of its cavity upon the initial inversion of the pan without shaking, 0 points was charged; thereafter, each cavity accrued one point for each shake required to dislodge the cake or muffin baked in it. For each cake or muffin which remained in the pan after ten shakes, fifteen points were assessed to that pan cavity. The release value assigned each formulation is equal to the sum of points charged to the cavities in the pan divided by the number of cavities. Consequently, the lower the release number is, the more effective is the parting composition as a release agent.

TABLE IV

This TABLE IV shows the addition of suspending agents to formulations, in the amount of 1 percent by weight, in order to enhance suspension of lecithin in the formulation, and gives releases values for these formulations.

| Suspending Agent | Lecithin Suspension Characteristics | Spray Coating Characteristics | Release Value, Average |
|---|---|---|---|
| Calcium Stearate | Paste-like, resuspended easily, settled quickly | Smooth, clear | 0.08 |
| Aluminum Stearate | Paste-like, resuspended easily | Smooth, clear | 0.12 |
| Magnesium Silicate | Solid mass, resuspended as chunks | Smooth, clear | 0.46 |
| Aluminum Silicate | Solid mass, resuspended as chunks | Smooth, clear with white flecks | 0.08 |
| Magnesium Aluminum Silicate | Paste-like, resuspended easily, settled quickly | Clogged aerosol valve | ND[1] |
| Calcium Silicate | Paste-like, resuspended easily settled quickly | Smooth, clear | 0.36 |
| Colloidal Silica (Fumed Silica) | Fluffy layer, easily resuspended settled slowly | Smooth, clear | 0.71 |
| Colloidal Silica (Precipita- | Easily resuspended, settled slowly | Smooth, clear | 0.87 |

| Suspending Agent | Lecithin Suspension Characteristics | Spray Coating Characteristics | Release Value, Average |
|---|---|---|---|
| ted Silica) | | | |

[1]Not done. Unable to perform because aerosol valve clogged.

TABLE IV describes results of efforts to determine the best suspending agent for lecithin as it was used in these formulations. Preferably, the suspending agent is capable of maintaining the suspension of the lecithin in a dispersed or fluffy layer that is easily resuspended throughout the entire formulation upon gentle shaking of the container. Any tendency for a suspending agent to clog aerosol valves or orifices is a serious deficiency. In addition, preferred suspending agents do not prevent the formation of a smooth, clear spray coating, and do not diminish the release characteristics of the formulation. TABLE IV indicates that fumed silica is a preferred suspending agent since it adequately enhanced lecithin dispersion and also resulted in a smooth, clear spray coating. Fumed silica showed no tendency to clog aerosol valves or in any manner interfere with flow of product through the valves. Fumed silica adequately enhanced lecithin dispersion or suspension in the composition and also gave a smooth, clear spray coating with suitable release characteristics, and is the preferred suspending agent.

EXAMPLE 5

Several compositions comprising 6 percent standard lecithin, 2 percent water, 1 percent fumed silica, 25 percent hydrocarbon propellant, and the indicated amounts (0.2 to 2.0 percent) of various humectants (polyhydric alcohols), balance canola oil, were prepared, and their water activities and release values were measured. The particular polyhydric alcohols, their quantities, and the results of the evaluation are set forth in TABLE V.

TABLE V

This TABLE V shows the addition of polyhydric alcohols as humectants to formulations, and gives release values for such formulations.

| Polyhydric Alcohol | Polyhydric alcohol in Formulation, % | Spray Char. (a) | Release Value Average |
|---|---|---|---|
| Glycerol | (M3 78A-B) | | |
| | 0.4 | Smooth, clear | 0.33 |
| | 2.0 | Smooth, clear | 0.46 |
| Propylene glycol | (M3 68A-C) | | |
| | 0.2 | Smooth, clear | 0.33 |
| | 0.5 | Smooth, clear | 1.00 |
| | 1.0 | Foamed | 1.42 |
| Sorbitol | (M3 79A-B) | | |
| | 0.4 | Smooth, clear | 0.79 |
| | 2.0 | Smooth, clear | 0.59 |
| Polyethylene glycol | (M3 80A-B) | | |
| | 0.4 | Foamed | 0.54 |
| | 2.0 | Foamed | 0.46 |

(a) See Part B of TABLE II for descriptive terms used to characterize sprays.

Glycerol and sorbitol were found to lower the water activity of parting compositions more effectively than the other compounds investigated. A slightly better release value for glycerol-containing, than for sorbitol-containing, formulations led to the selection of glycerol for further study.

In addition to lowering of water activity, an additional benefit derived from including humectants such as glycerol in the food release formulations is the reported capacity of surfactants (including polyhydric alcohol-containing compounds similar to glycerol) to facilitate the dispersion of lecithin in edible oils. Improved lecithin dispersibility from added glycerol may have been responsible for eliminating foaming of aerosol-sprayed coatings containing only 1 percent by weight water instead of the 1.5 to 2.0 percent by weight water concentrations required to prevent foaming in formulations not containing glycerol or any other humectant.

TABLE VI

Water, glycerol, and various combinations of water and glycerol in Formulas T2 34A-M, with related water activity values and spray coating characteristics are shown in this TABLE VI.

| | PART A | | | | |
|---|---|---|---|---|---|
| | Formulas T2 34 A-E | | | | |
| Item | A | B | C | D | E |
| Ingredient variables,* | | | | | |
| water | 0 | 0 | 0 | 0 | 0 |
| glycerol | 0 | 0.5 | 1 | 2 | 3 |
| Water activity of formulae | 0.385 | 0.377 | 0.507 | 0.429 | 0.480 |
| Characteristics of spray at 70° F.** | Foam | Foam | Smooth Clear | Smooth Clear | Smooth Clear |

| | PART B | | | |
|---|---|---|---|---|
| | Formulas T2 34 F-I | | | |
| Item | F | G | H | I |
| Ingredient variables,* | | | | |
| water | 0.5 | 0.5 | 0.5 | 1 |
| glycerol | 0.5 | 1 | 2 | 0 |
| Water activity of formulae | 0.545 | 0.571 | 0.564 | 0.670 |
| Characteristics of spray at 70° F.** | Smooth Clear | Smooth Clear | Smooth Clear | Smooth Clear |

| | PART C | | | |
|---|---|---|---|---|
| | Formulas T2 34 J-M | | | |
| Item | J | K | L | M |
| Ingredient variables,* | | | | |
| water | 1 | 1 | 1 | 1 |
| glycerol | 0.5 | 1 | 2 | 3 |
| Water activity of formulae | 0.635 | 0.616 | 0.556 | 0.523 |
| Characteristics of spray at 70° F.** | Smooth Clear | Smooth Clear | Smooth Clear | Smooth Clear |

*All formulas contained, in addition to combinations of the various percentages of water and glycerol, the following ingredients: standard lecithin having about 63 percent acetone-insolubles, 6 percent; fumed silica, 1 percent; hydrocarbon propellant, 25 percent; balance canola oil.
**See TABLE II for descriptive terms used to characterize sprays. Spray coatings indentified as smooth in this TABLE were also transparent. No determination was made of the transparency of spray coatings that foamed.

TABLE VI includes results of tests done to reveal the influence on water activity of pan spray formulations of various combinations of water and glycerol. Release values and spray characteristics were acceptable for formulas K and L with K preferred, because of the increased glycerol content in L, for economic reasons.

TABLE VII

The influence of various combinations of water, fumed silica, glycerol, and lecithin on spray characteristics is summarized below. The test formulations contained, in addition to the indicated amounts of water, fumed silica, and glycerol, the following ingredients: standard lecithin (about 63 percent acetone-insolubles) 6 percent; hydrocarbon propellant, 25 percent; and balance canola oil.

| Formula | Weight Percent | | | | Description[1] |
| --- | --- | --- | --- | --- | --- |
| | Water | Fumed Silica | Glycerol | Lecithin | |
| T2 19F | 4.0 | — | — | 6.0 | S: Smooth[2], slight haze, lecithin visible as fibrous network  L: Opaque/yellow |
| M3 143B | 3.5 | — | — | 6.0 | S: Smooth, lecithin visible as fibrous network, not clear  L: Opaque/yellow |
| M3 143A | 3.0 | — | — | 6.0 | S: Smooth, lecithin visible as fibrous network, not clear  L: Opaque/yellow |
| M3 143C | 2.5 | — | — | 6.0 | S: Smooth, lecithin slightly visible  L: Slightly opaque, golden amber, no aggregation |
| T2 19E | 2.0 | — | — | 6.0 | S: Smooth, clear  L: Translucent/amber, aggregation |
| M3 64A | 2.0 | 1.0 | — | 6.0 | S: Smooth, repeat spray leaves cloud  L: No aggregation |
| T2 34C | — | 1.0 | 1.0 | 6.0 | S: Foam  L: No aggregation |
| T2 34K | 1.0 | 1.0 | 1.0 | 6.0 | S: Smooth, clear repeat spray leaves no cloud  L: Opaque, yellow creamy appearance |

[1]"S" refers to the characteristics of the sprayed-on coating and "L" refers to the characteristics of the lecithin layer of formulations in glass aerosol bottles.
[2]See Part B of TABLE II for explanation of descriptive terms used to characterize sprays.

TABLE VII shows the development of increased milkiness of the spray coatings containing 6 percent lecithin as water is increased above 2 percent. Even at 2 percent water, upon repeated spraying of a glass surface, particles of lecithin can be viewed as being responsible for a cloudiness in the spray coating even though the oil is transparent. Only with the addition of the humectant, glycerol, is the lecithin altered so that the surface remains clear even upon repeated spraying of a glass surface (Formula T2 34K). Formulation T2 34K is preferred among those in TABLE VII. However, all the formulations of TABLE VII yield satisfactory appearance and performance.

EXAMPLE 6

To demonstrate the smoothness and clarity of the spray coating produced by parting compositions according to the present invention, two such compositions were prepared and compared with several commercially available (in retail stores) food parting compositions. Formulations 1a (formula T2 19F) and 1b (formula T2 34K) represent parting compositions according to the present invention comprising 6 percent standard lecithin and 25 percent propellant; formulation 1a had 4 percent water, and formulation 1b 1 percent water, 1 percent glycerol and 1 percent fumed silica, the balance of both formulations comprising canola oil. The commercially available samples differ from the parting compositions of this invention with respect to their lack of added water (Samples 2a, 2b and 2c) or the presence of excess water (Samples 3a, 3b and 3c).

Commercial Formulas in TABLE VIII

The compositions of the commercially available products, based on laboratory analysis, are as follows:

| | Compositions | % by Weight of Formula |
|---|---|---|
| 2a | Vegetable Oil | 69.0 |
| | Lecithin | 6.0 |
| | Propellant | 25.0 |
| 2b | Vegetable Oil | 79.80 |
| | Lecithin | 5.00 |
| | Beta Carotene | .10 |
| | Flavor | .10 |
| | Propellant | 15.00 |
| 2c | Vegetable Oil | 57.48 |
| | Lecithin | 8.50 |
| | Ethanol | 6.00 |
| | Isopropyl Citrate | .01 |
| | Methyl Silicone | .01 |
| | Propellant | 28.00 |
| 3a | Water | 64.885 |
| | Vegetable Oil | 12.50 |
| | Lecithin | 7.50 |
| | Flavor | .0500 |
| | Potassium Sorbate | .0500 |
| | Calcium Disodium EDTA | .0075 |
| | Beta Carotene | .0075 |
| | Propellant | 15.00 |
| 3b | Water | 59.916 |
| | Vegetable Oil | 16.748 |
| | Lecithin | 5.250 |
| | Sorbic Acid | .045 |
| | Potassium Sorbate | .039 |
| | Beta Carotene | .002 |
| | Propellant | 18.000 |
| 3c | Water | 61.70 |
| | Vegetable Oil | 15.00 |
| | Lecithin | 6.00 |
| | Potassium Sorbate | .20 |
| | Sorbic Acid | .10 |
| | Propellant | 17.00 |

The two formulations according to the present invention and the six commercial formulations were sprayed on cupcake pans and tested in accordance with the testing procedure described above to determine the release values. A summary of the results appears in the following TABLE VIII.

TABLE VIII

This TABLE VIII shows the performance (release values) of pan sprays containing small amounts of water in accordance with the present invention in comparison with commercial products comprising food releases sprays, i.e., food parting compositions, comprising emulsion and oil-based pan sprays.

| Description | Water Content % | Appearance of Spray-coating | Release Value[1] BB | CC | Avg. |
|---|---|---|---|---|---|
| 1a No glycerol | 4 | Clear, smooth | 0 | .67 | .34 |
| 1b 1% glycerol | 1 | Clear, smooth | .33 | 1.25 | .79 |
| 2a Commercial produce | None | Clear, foam | .50 | 1.16 | .83 |
| 2b Commercial product | None | Clear, foam | 15.0 | 6.0 | 10.5 |
| 2c Commercial product | None | Clear, bubbles | .42 | .33 | .38 |
| 3a Commercial product | 64.9 | White, irregular | 10.3 | 3.5 | 6.9 |
| 3b Commercial product | 59.9 | White, irregular | 14.2 | 7.3 | 11.0 |
| 3c Commercial product | 61.7 | Cloudy, smooth | 4.8 | 2.3 | 3.6 |

[1]Release values are for blueberry muffins ("BB"); cupcakes ("CC"); and the average release for both ("Avg.").

The data in TABLE VIII show that the commercially available parting compositions formed spray coatings which were either smooth (i.e., non-foaming) or clear, but not both, as observed with formulations according to the present invention.

It is believed that the opaque-to-cloudy appearance of the commercial products 3a, 3b and 3c was due to excessive hydration of the lecithin resulting from the high water content in those formulations. The compositions 1a and 1b according to the present invention provided a smooth, clear spray coating and performed much better with respect to release than the commercial products 2b, 3a, 3b and 3c and comparably to commercial products 2a and 2c. In addition, because of the limited amount of water in the formulations of the present invention, the stability of the lecithin dispersion in the edible oil is enhanced and the likelihood of spoilage, rancidity and bacterial contamination of the formulations is reduced.

EXAMPLE 7

A series of formulations was prepared to evaluate the effect of various amounts of humectant in various parting compositions including some compositions with no added water. In this study, all the formulations comprised 6 percent standard lecithin (63% acetone-insolubles), 1 percent fumed silica, 25, 50 or 75 percent hydrocarbon propellant, variously no or up to 3.8 percent water and varying quantities (0.2 to 15 percent by weight) of glycerol, polyethylene glycol, propylene glycol or sorbitol, the balance of the tested formulations being canola oil. (All percents are percent by weight of the formulations.) The formulations were prepared and the characteristics of the spray coatings produces on a stainless steel surface were observed.

Polyethylene Glycol

Food grade polyethylene glycol having an average molecular weight of 300 and sold under the trademark CARBOWAX by Union Carbide Corporation was added to the formulations in amounts ranging from 0.4 to 15 percent by weight, the water content of the formulation being variously 0, 1 or 2 percent. In formulations containing 2 percent water small amounts of polyethylene glycol, i.e., less than 2 percent by weight, provided smooth, non-foaming coatings. Formulations which did not contain water or which contained an inadequate amount of water in accordance with the teachings of the present invention, the polyethylene glycol by itself did not prevent undesirable foaming.

The above results indicate that in the absence of water, polyethylene glycol is unable to prevent foaming at polyethylene concentrations of from 1 to 15 percent by weight. At concentrations of from about 1 to 5 percent polyethylene glycol, the polyethylene glycol is not a substitute for water in the formulations. In the presence of an adequate amount of water to prevent foaming in accordance with the teachings of this invention, polyethylene glycol concentrations of less than 2 percent by weight does not adversely affect the foam inhibition provided by the proper amounts of water in accordance with the teachings of the present invention.

Glycerol

Glycerol in amounts of from 0.5 to 30 percent by weight was added to a series of formulations containing no added water and either 25 percent or 75 percent by weight propellant. Generally, the results of these tests indicated that glycerol, even in the absence of water, was effective to suppress foaming provided that, if the glycerol were at low concentrations, the propellant was correspondingly increased. For example, at 0.5 percent by weight glycerol foaming occurred with 25 percent propellant but with 75 percent propellant only slight bubbles were observed and, it is believed that appropriate valve design would eliminate even the slight bubbling. At 3 percent glycerol and no added water and 25 percent propellant bubbles were noted in the sprayed-on coating but at 75 percent propellant no foam or bubbles were noted. In glycerol concentrations above 10 percent by weight glycerol no foam was noted even with only 25 percent by weight propellant.

The above results indicate that glycerol used with an amount of propellant which increases with decreasing amounts of glycerol, effectively inhibits foaming even in formulations which contain no added water. While such formulations work they are not economically feasible at the present time, because of the cost of glycerol relative to water and the large amounts of propellant that would be required at low glycerol concentrations. It should be noted that the vapor pressure of glycerol is believed to be less than 0.1 mm of mercury at 20° C. and therefore glycerol is not categorized as a prohibitive volatile organic compound pursuant to the regulations of the California Air Resources Board. Consequently, although a glycerol-containing composition with no added water does not appear to be economically feasible at the present time, it does provide smooth and clear aerosol-dispensed coatings as shown by the data of TABLE IX.

The formulations of TABLE IX contained 6 percent standard lecithin (63% acetone-insolubles), 1 percent fumed silica, 25 percent or 75 percent propellant and glycerol in the amounts as indicated in the TABLE, with no added water.

TABLE IX

| Formula T2- | Percent Glycerol | Percent Propellant | Smoothness and Clarity Characteristics of Spray Coat |
|---|---|---|---|
| 34B | 0.5 | 25 | Foamed, Clear |
|  |  | 75 | Slight Bubbles, Clear |
| 34C | 1 | 25 | Foamed, Clear |
|  |  | 75 | Slight Bubbles, Clear |
| 34D | 2 | 25 | Slight Foam, Clear |
|  |  | 75 | Slight Bubbles, Clear |
| 34E | 3 | 25 | Bubbles, Clear |
|  |  | 75 | Smooth, Clear |
| 34B | 5 | 25 | Bubbles, Clear |

TABLE IX-continued

| Formula T2- | Percent Glycerol | Percent Propellant | Smoothness and Clarity Characteristics of Spray Coat |
|---|---|---|---|
| | | 75 | Smooth, Clear |
| 38D | 10 | 25 | Bubbles, Clear |
| | | 75 | Smooth, Clear |
| 38F | 15 | 25 | Smooth, Slightly Milky |
| 62A | 20 | 25 | Smooth, Slightly Milky |
| 52B | 30 | 24 | Smooth, Slightly Milky |

TABLE IX shows that with increasing glycerol and-/or increasing propellant, a smooth coating may be attained in a composition which contains no added water. The data of TABLE IX shows that smooth coatings were obtained at 5 percent glycerol and 75 percent propellant and that only slight bubbles were formed at 1 percent glycerol and 75 percent propellant. At 2 percent glycerol and 25 percent propellant only slight foam was encountered and slight bubbles at 75 percent propellant. At 3 percent glycerol and 25 percent propellant some bubbles were encountered but at 75 percent propellant a smooth coating was obtained. All the formulations of TABLE IX contain no added water and provided clear coatings. It is seen that without added water a significant amount of glycerol and increased amounts of propellant are required to provide a smooth coating. At 15 percent glycerol and 25 percent propellant a smooth, slightly milky coating was obtained.

Propylene Glycol

Generally, propylene glycol behaved in the formulations in a manner somewhat similar to that described above for polyethylene glycol. Formulations were prepared containing from 0.2 to 15 percent by weight propylene glycol in compositions containing either 0, 0.75 or 2 percent water and either 25 or 50 percent by weight propellant. In amounts of from about 0.2 to 2 percent by weight and an amount of water to inhibit foaming in accordance with the teachings of the present invention, propylene glycol did not interfere with the foam-inhibiting qualities of the appropriate amount of added water. Concentrations of propylene glycol above 2 percent to less than 10 percent foaming results which could not be compensated for by adjusting aerosol valve characteristics or by changing the kind or concentration of propellant used. When formulations contained no or inadequate added water in accordance with the teachings of the present invention to inhibit foaming, the presence of propylene glycol did not inhibit foaming in the same manner as glycerol did.

The above results indicate that in the absence of the requisite amount of added water, propylene glycol is unable to prevent foaming of the tested concentrations of 1 to 15 percent. However, in the presence of amounts of water appropriate to inhibit foaming in accordance with the teachings of the present invention, small concentrations of propylene glycol, up to about 1 percent or so, do not cause foaming of the compositions.

Sorbitol

Sorbitol is a powder which does not dissolve in lecithin and edible oil mixtures. Therefore, sorbitol can not be added to formulations in accordance with the teachings of the present invention unless dissolved in water or some other solvent suitable for the sorbitol. Attempts to add sorbitol without water resulted in clogging of the aerosol valve orifices. The use of sorbitol dissolved in small amounts of water was accomplished by diluting sorbitol in an aqueous solution (sold under the trademark SORBO by ICI America, Inc.) with small amounts of water to provide a total water content in accordance with the teachings of the present invention to inhibit foam formation, provided smooth, i.e., non-foaming spray coatings. In the absence of sufficient water in accordance with the teachings of the present invention, and with only enough water to place the sorbitol into solution, foaming was noted but the amount of foaming was reduced by increasing propellant concentrations from 25 to 50 percent by weight.

The above results indicate that in the absence of added water to bring the formulation within the parameters of the teachings of the present invention to suppress foam formation, sorbitol dissolved in water does not inhibit or prevent foaming. However, small concentrations of sorbitol dissolved in water in compositions in which the total amount of water present is sufficient to inhibit foaming, do not interfere with the foaming suppression of the added water. There is some suggestion from the test results conducted that sorbitol may be able to replace a very small proportion of the amount of added water necessary to inhibit foaming, that is, the presence of sorbitol may slightly reduce the amount of water needed at the lower ends of water content to prevent foaming.

EXAMPLE 8

A formulation according to the present invention was prepared using a variety of different edible oils, to determine whether the choice of oil had a material effect on the performance of the parting composition. The formulation for this evaluation comprised 6 percent standard lecithin, 1 percent water, 1 percent glycerol, 1 percent fumed silica, 25 percent A-46 propellant (propane and isobutane), the balance (66 percent) being the oil. A series of such formulations were prepared using corn, safflower, sunflower, canola, peanut, olive, partially hydrogenated winterized soybean, and lightly hydrogenated winterized canola oils, respectively. The release values for these formulations used in baking ranged between 0.34 and 0.70, showing that the oils may be interchanged in the formulation without materially affecting the release properties of the parting compositions according to the present invention. In addition, all the parting compositions comprising these oils produced smooth, clear spray coatings when applied as aerosol sprays to a stainless steel surface, and produced lecithin suspensions which were easily resuspended in test bottles after settling.

EXAMPLE 9

To determine whether any particular propellant materially affected the performance characteristics of parting compositions according to the present invention, a standard formulation comprising 6 percent standard lecithin having 63 percent acetone-insolubles (phosphatides), 1 percent water, 1 percent glycerol, 1 percent fumed silica, and, variously, 15, 20 or 25 percent propellant, the balance in each case being canola oil, were prepared. A fluorocarbon propellant, 1,1-difluoroethane (HFC-152a) was added to formulations at 15 and 20 percent (all percents herein are percents by weight). In other samples, a hydrocarbon blend propellant which comprised 16 percent propane, 82 percent isobutane and 2 percent n-butane was added in a formulation in the amount of 25 percent by weight. The three formulations were sprayed on a baking utensil and cakes were baked in the utensils to determine the release values, which ranged from 0.38 to 0.79, reflecting good performance with very little variation.

The fluorocarbon propellant is one which is exempt from Volatile Organic Compound (VOC) status by State of California, Air Resources Board (CARB), Stationary Source Division. Thus, VOC-exempt fluorocarbon propellants can be used to produce a product in accordance with the present invention containing no volatile organic compounds as described by CARB. However, such fluorocarbon propellants have not as yet been approved for food use.

A variety of parting compositions according to the present invention were prepared including the following formulations of TABLE VII: M3 64A, T2 19E, T2 34C, T2 34K and six other comparable compositions. The effectiveness of these compositions of the present invention was tested with regard to their ability to function on a fry pan. In one set of tests, the test food was a fried egg; in another set of tests, the test food was a pancake prepared from Aunt Jemima brand buttermilk complete pancake mix. In the case of egg frying, the pan was sprayed with the test formulations and heated to approximately 300° F. An egg was deposited on the pan, and when it appeared to be partially cooked and sufficiently brown on the bottom, the release characteristics of the various formulations were tested by attempting to flip the egg over by a quick vertical hike of the pan. One such flip was accomplished with each formulation before the egg stuck to the pan. In an alternative test, a spatula was used to turn the egg over, and the number of times which this could be done without having to scrape the egg from the pan was noted. Most formulations allowed one such turn.

The pancake release was tested on skillets which were spray-coated and then heated to 400° F.–450° F. When the batter had turned sufficiently brown to allow for turning, a "flip" turn was attempted, in the manner described above with respect to eggs. All but two of the nine formulations according to this invention provided sufficient release to allow a flip turn. Generally, the compositions provided sufficient release to allow from three to twelve spatula turns.

In both the egg tests and the pancake tests, three commercially available food release products were tested under identical conditions, and the compositions of the present invention gave results comparable to those of the commercial products. The four formulations of TABLE VII performed somewhat better than the commercially available food release sprays. For example, only formulation T2 34K did not permit a flip turn whereas each of the other three identified formulations did. In contrast, two of the three commercial preparations did not permit one flip turn whereas only one of them did. With respect to spatula turns for pancakes, formulations M3 64A and T2 19E of TABLE VII provided twelve spatula turns, formulation T2 34C provided ten spatula turns and formulation T2 34K provide eight spatula turns whereas the three commercial preparations provided, respectively, twelve, eight and six spatula turns. In the egg test each of the four identified compositions of TABLE VII and each of the three commercially available preparations provided one flip turn. In the spatula test, each of the four identified formulations provided one spatula turn, and another formulation, M3 149C provided two spatula turns. (The composition of formulation M3 149C is 6 percent standard lecithin, 1 percent fumed silica, 1 percent water, 1 percent glycerol, 25 percent hydrocarbon propellant, 0.1 percent calcium stearate, balance—65.9 percent—canola oil.) The three commercially available compositions provided, respectively, one, two and three spatula turns.

In those compositions of the invention in which a humectant is present, generally the ratio of water to humectant should increase with increasing acetone-insolubles (phosphatides) content of the composition. For purposes of quantification, the term "percent humectant plus water relative to phosphatides content" is defined as the percentage obtained by dividing the weight of humectant plus water in the composition by the sum of the weight of humectant plus water plus phosphatides in the composition, and multiplying the result by 100. The term "percent humectant plus water relative to phosphatides content" is abbreviated herein as "percent HWP" and the mathematical definition thereof may be given as follows:

$$\text{Percent } HWP = \frac{\text{weight of humectant + water}}{\text{weight of (humectant + water + phosphatides)}} \times 100 \quad \text{(II)}$$

As the phosphatide content of the formulation increases, the weight ratio of water to humectant should be increased in order to insure obtaining a clear, non-foaming aerosol spray coating of the composition. A smooth spray coat was obtained at glycerol to water weight ratios of up to 5:1. The spray coatings remained clear up to a phosphatide content of 12.6 percent, when slight haziness began to develop.

TABLE X

TABLE X shows in PART A formulations containing standard lecithin, glycerol and water in the amounts indicated, 25 percent hydrocarbon propellant, and the balance comprising corn oil. The formulations containing 6 percent lecithin included 1 percent fumed silica and the formulations containing 15 or 20 percent lecithin contained 2 percent fumed silica.

| | PART A | | |
|---|---|---|---|
| Sample No. | Weight Percent | | Weight Ratio Glycerol to Water |
| | Glycerol | Water | |
| 1 | 0.75 | 0.75 | 1:1 |
| 2 | 1.00 | 0.50 | 2:1 |
| 3 | 1.125 | 0.375 | 3:1 |
| 4 | 1.20 | 0.30 | 4:1 |
| 5 | 1.25 | 0.25 | 5:1 |
| 6 | 2.00 | 2.00 | 1:1 |
| 7 | 2.67 | 1.33 | 2:1 |
| 8 | 3.00 | 1.00 | 3:1 |
| 9 | 3.20 | 0.80 | 4:1 |
| 10 | 3.33 | 0.67 | 5:1 |
| 11 | 1.90 | 1.90 | 1:1 |
| 12 | 2.53 | 1.267 | 2:1 |
| 13 | 2.85 | 0.95 | 3:1 |
| 14 | 3.04 | 0.76 | 4:1 |
| 15 | 3.17 | 0.63 | 5:1 |
| 16 | 5.05 | 5.05 | 1:1 |
| 17 | 6.73 | 3.37 | 2:1 |
| 18 | 7.58 | 2.53 | 3:1 |
| 19 | 8.08 | 2.02 | 4:1 |
| 20 | 8.42 | 1.68 | 5:1 |
| 21 | 2.53 | 2.53 | 1:1 |
| 22 | 4.05 | 1.01 | 4:1 |
| 23 | 6.73 | 6.73 | 1:1 |
| 24 | 10.77 | 2.69 | 4:1 |

Formulations Nos. 1-10 contained 6 percent lecithin (3.8 percent phosphatides), formulations Nos. 11-20 contained 15 percent lecithin (9.45 percent phosphatides), and formulations Nos. 21-24 contained 20 percent lecithin (12.6 percent phosphatides). Formulations Nos. 1-5, 11-15, and 21-22 have a Percent HWP of 28.5; formulations Nos. 6-10, 16-20, and 23-24 have a Percent HWP of 51.4. When the formulations of Part A of TABLE X containing about fifty percent propellant were applied by aerosol spray to a stainless steel surface, mostly smooth and clear coatings were obtained except as otherwise noted in the footnote of Part B of TABLE X, in which the degree of foaming and clarity of these coatings is set forth. Formulations Nos. 1-24 are not identified by number in Part B, but are grouped by category. The first line of each two-line set of data gives the codes for smoothness of the coating and the second line gives the code for clarity of the coating, as follows. Smoothness code (first line) is: "S" means smooth. Clarity codes (second line) are: "C" means clear and "Sl. h" means slight haze.

| Weight Ratio Glycerol to Water | Percent HWP = 28.5 % Phosphatide | | | Percent HWP = 51.4 % Phosphatide | | |
|---|---|---|---|---|---|---|
| | 3.8 | 9.45 | 12.6 | 3.8 | 9.45 | 12.6 |
| 1:1 | S | S² | S | S | S | S |
| | C | C | C | C | C | Sl.h. |
| 2:1 | S¹ | S | — | S | S | — |
| | C | C | — | C | C | — |
| 3:1 | S¹ | S | — | S | S | — |
| | C | C | — | C | C | — |
| 4:1 | S¹ | S | S³ | S | S | S |
| | C | C | C | C | C | Sl.h. |
| 5:1 | S¹ | S | — | S | S | — |
| | C | C | — | C | C | — |

$^{1,2,3}$Testing of the same formulations at 25 precent propellant instead of 50 percent, yielded for these formulations coatings displaying:
$^1$Slight bubbles
$^2$Slight foam
$^3$Foam Generally, the percent glycerol plus water to phosphatides, ("Percent HWP" as defined above) for obtaining a smooth, clear aerosol-dispensed coating is from about 21 to 61 Percent HWP, preferably from about 25 to 57 Percent HWP. It is a coincidence that these numerical values are identical to those for Percent RWC discussed above.

EXAMPLE 10

Preferred formulas containing 1, 6 and 12 percent, respectively, of standard lecithin having a 63 percent acetone-insolubles content, i.e., phosphatides content, are set forth below.

| | Percent by Weight of the Formulation | | |
|---|---|---|---|
| Lecithin | 1.000 | 6.00 | 12.00 |
| Edible Oil | 71.092 | 66.00 | 57.00 |
| Fumed Silica | 0.500 | 1.00 | 2.00 |
| Glycerol | 0.200 | 1.00 | 2.00 |
| Water | 0.200 | 1.00 | 2.00 |
| Propellant | 25.00 | 25.00 | 25.00 |
| Butter Flavor | 2.000 | — | — |
| Beta Carotene | 0.008 | — | — |

The oil of choice at 1 percent lecithin with added butter flavor or other flavors is corn oil because of the low flavor background of corn oil.

The weight percent flavorant used in flavored versions will vary with the specific flavor employed.

While the invention has been described with reference to particular embodiments thereof, it will be appreciated that numerous variations to the described embodiments will be within the scope of the appended claims.

What is claimed is:

1. An aerosol-dispensable foodstuffs parting composition for-coating cooking surfaces contains from zero to less than about 7.5 percent by weight of monohydric aliphatic alcohols, is combined with a pressurized, normally gaseous propellant suitable for discharging the composition as an aerosol spray, and comprises lecithin and water both dispersed in an edible oil vehicle, the weight of the edible oil vehicle present in the composition exceeding the combined weight of the lecithin and the water present, the water being present in an amount which is sufficient to partially, but not fully, hydrate the lecithin to an extent that solubility of the lecithin in the edible oil is sufficiently reduced so that aerosol-dispensed coatings of the composition are rendered non-foaming and clear at ambient temperatures.

2. The parting composition of claim 1 wherein the composition is free of monohydric aliphatic alcohols.

3. The parting composition of claim 1 wherein the lecithin has a known phosphatide content and the lecithin and water are present in amounts to provide a percent relative water content ("percent RWC"), which is calculated by dividing the weight of water in the composition by the sum of the weight of water plus phosphatides in the composition, and multiplying the result by 100, of from about 21 to 61 percent RWC.

4. The parting composition of claim 3 wherein the percent relative water content is from about 25 to 57 percent RWC.

5. The parting composition of claim 1 wherein the lecithin comprises from about 1 to 25 percent by weight of the composition.

6. The parting composition of claim 1, 2, 3, 4 or 5 further comprising a humectant selected from the group consisting of one or more of glycerol, sorbitol and propylene glycol.

7. The parting composition of claim 6 wherein the humectant comprises glycerol.

8. A foodstuffs parting composition consisting essentially of from about 1 to 25 percent by weight lecithin having a known phosphatide content, from about 0.2 to 22 percent by weight water and an edible oil vehicle, the weight of the edible oil vehicle present in the composition exceeding the combined weight of the lecithin and water present, the lecithin and water being present in amounts sufficient to partially, but not fully, hydrate the lecithin and to provide a percent relative water content ("percent RWC"), which is calculated by dividing the weight of water in the composition by the sum of the weight of water plus phosphatides in the composition, and multiplying the result by 100, of from 21 to 61 percent RWC, so that aerosol-dispensed coatings of the composition are rendered non-foaming and clear at ambient temperatures.

9. The parting composition of claim 8 wherein the percent relative water content is from about 25 to 57 percent RWC.

10. A foodstuffs parting composition comprises from about 1 to 25 percent by weight lecithin having a known phosphatide content, from about 0.1 to 18 percent by weight water, from about 0.2 to 19 percent by weight of a humectant comprising glycerol, the humectant, lecithin and water being present in amounts sufficient to partially, but not fully, hydrate the lecithin and to provide a percent humectant plus water relative to phosphatide content ("percent HWP"), which is calculated by dividing the weight of water plus humectant in the composition by the sum of the weight of water plus humectant plus phosphatides in the composition, and multiplying the result by 100, of from about 21 to 61 percent HWP, the composition further comprising an edibile oil vehicle, the weight of the edible oil vehicle present in the composition exceeding the combined weight of the lecithin and water present, such that the aerosol-dispensed coatings of the composition are rendered non-foaming and clear at ambient temperatures.

11. The parting composition of claim 10 wherein the percent HWP is from about 25 to 57 percent HWP.

12. An aerosol-dispensable foodstuffs parting composition which contains from zero to less than 7.5 percent by weight of monohydric aliphatic alcohols and comprises from about 1 to 20 percent by weight of a lecithin component having a known phosphatide content, from about 0.4 to 15 percent by weight of a humectant selected from the group consisting of one or more of glycerol, sorbitol and propylene glycol, and from about 0.1 to 11 percent by weight water, the lecithin and water being present in amounts sufficient to partially, but not fully, hydrate the lecithin and to provide a percent humectant plus water relative to phosphatides content ("percent HWP"), which is calculated by dividing the weight of humectant plus water in the composition by the sum of the weight of humectant plus water plus phosphatides in the composition, and multiplying the result by 100, of from about 21 to 61 percent HWP, the composition further comprising an edible oil vehicle, the weight of the edible oil vehicle present in the composition exceeding the combined weight of the lecithin and water, and a pressurized, normally gaseous propellant suitable for discharging the composition as an edible spray, such that the aerosol-dispensed coatings of the composition are rendered non-foaming and clear at ambient temperatures.

13. The parting composition of claim 12 wherein the percent HWP is from about 25 to 57 percent HWP, and the water is present in the amount of from about 0.1 to 9 percent by weight.

14. The parting composition of claim 12 wherein the humectant comprises glycerol.

15. An aerosol-dispensable foodstuffs parting composition which contains from zero to less than 7.5 percent by weight of monohydric aliphatic alcohols and comprises from about 1 to 20 percent by weight of a lecithin component having a known phosphatide content, and from about 0.2 to 22 percent by weight water, the lecithin and water being present in amounts to partially, but not fully hydrate the lecithin, and to provide a percent relative water content ("percent RWC"), which is calculated by dividing the weight of water in the composition by the sum of the weight of water plus phosphatides in the composition, and multiplying the result by 100, of from about 21 to 61 percent RWC, the composition further comprising an edible oil vehicle, the weight of the edible oil vehicle present in the composition exceeding the combined weight of the lecithin and water present, and further comprising a pressurized, normally gaseous propellant suitable for discharging the composition as an edible spray, so that aerosol-dispensed coatings of the composition are rendered non-foaming and clear at ambient temperatures.

16. The parting composition of claim 15 wherein the percent relative water content is from about 25 to 57 percent RWC and the water is present in the amount of from about 0.3 to 18 percent by weight.

17. The parting composition of any one of claim 5, 8, 12 or 13, wherein the lecithin component comprises from about 4 to 12 percent by weight, the humectant comprises from about 1 to 9 percent by weight, the water comprises from about 0.2 to 6 percent by weight, and the propellant comprises from about 10 to 75 percent by weight of the composition.

18. The parting composition of any one of claims 1, 8, 10, 12, 15 or 16 further comprising a colloidal silica suspending agent present in an amount effective to facilitate suspension of the lecithin in the edible oil.

19. The parting composition of claim 18 wherein the colloidal silica comprises fumed silica.

20. The parting composition of claim 1, 8 or 12 further comprising a propellant and one or more modifying agents.

21. The parting composition of any one of claims 8 through 13, 15 or 16 wherein the composition contains from zero to less than 7.5 percent by weight of monohydric aliphatic alcohols.

22. The parting composition of claim 21 wherein the pressurized, normally gaseous, propellant comprises from about 10 to 75 percent by weight of the composition.

23. The parting composition of any one of claims 18 through 13, 15, or 16, wherein the lecithin component is selected from the group consisting of one or more of standard lecithin, acetylated lecithin and hydroxylated lecithin.

* * * * *

REEXAMINATION CERTIFICATE (3708th)

United States Patent [19]
Clapp et al.

[11] B1 5,374,434
[45] Certificate Issued Jan. 19, 1999

[54] FOOD RELEASE COMPOSITIONS

[75] Inventors: Clarence P. Clapp; George S. Torrey, both of Danville, Ill.

[73] Assignee: Creative Products Inc., Rossville, Ill.

Reexamination Request:
No. 90/004,438, Oct. 30, 1996

Reexamination Certificate for:
Patent No.: 5,374,434
Issued: Dec. 20, 1994
Appl. No.: 787,193
Filed: Nov. 4, 1991

[51] Int. Cl.⁶ .................. A23D 9/00; A23J 7/00
[52] U.S. Cl. ............... 426/116; 426/609; 426/662; 426/811
[58] Field of Search .................. 426/116, 609, 426/811, 662, 115

[56] References Cited

U.S. PATENT DOCUMENTS

| | | | |
|---|---|---|---|
| 2,555,972 | 6/1951 | Karjala . | |
| 3,896,975 | 7/1975 | Follmer | 222/192 |
| 4,073,411 | 2/1978 | Doumani | 222/192 |
| 4,104,403 | 8/1978 | Barker et al. | 424/365 |
| 4,142,003 | 2/1979 | Sejpal | 426/601 |
| 4,155,770 | 5/1979 | Doumani | 106/267 |
| 4,192,898 | 3/1980 | Hanson, Sr. | 426/250 |
| 4,339,465 | 7/1982 | Strouss et al. | 426/293 |
| 4,371,451 | 2/1983 | Scotti et al. | 252/305 |
| 4,425,164 | 1/1984 | Bliznak | 106/150 |
| 4,459,285 | 7/1984 | Grollier et al. | 424/74 |
| 4,654,220 | 3/1987 | Heine et al. | 426/609 |

OTHER PUBLICATIONS

Norbert Adolf Lange, ed., *Handbook of Chemistry* (eighth edition; Sandusky, OH: Handbook Publishers, Inc., 1952) Ethyl Alcohol Table at pp. 1203–1207.

Schmidt, et al., Modified Lecithins, Chapter 10, pp. 203–211 of Lecithins, ed. B.F. Szuhaj, et al., 1985.

Robert S. Igoe, *Dictionary of Food Ingredients* 2nd ed. (NY: Van Nostrand Reinhold, 1989), 109.

*Primary Examiner*—Steven L. Weinstein

[57] ABSTRACT

A parting composition for facilitating the release of foodstuffs from cooking utensils contains an edible oil, lecithin and water and, optionally, a humectant such as glycerol. The water is present in an amount sufficient to partially, but not fully, hydrate the lecithin so as to render the parially hydrated lecithin insoluble in the edible oil. The composition, which may further include a suitable normally gaseous propellant to discharge the composition from a conventional aerosol spray can, provides a substantially clear and smooth spray coating on cooking utensils at ambient temperatures, without the need for ethyl alcohol in the composition. The composition may optionally include conventional modifying agents such as suspending agents, antioxidants, preservatives, flavorants, etc.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 4, lines 11–24:

Another aspect of the present invention provides a foodstuffs parting composition which consists essentially of from about 1 to 25 percent by weight lecithin having a known phosphatide content, e.g., *4 to 12 percent lecithin*, from about 0.2 to 22 percent by weight water, the lecithin and water being present in amounts to provide a percent relative water content (calculated by dividing the weight of water in the composition by the sum of the weight of water plus [phosphateides] *phosphatides* in the composition, and multiplying the result by 100), of from about 21 to 61 percent, e.g., from about 25 to 57 percent. The composition also contains from about 98.7 to 53 percent by weight of edible oil. Optionally, this composition may also contain a propellant and one or more modifying agents.

Column 4, lines 25–44:

Yet another aspect of the present invention provides a foodstuffs parting composition which comprises from about 1 to 25 percent by weight lecithin having a known phosphatide content, from about 0.1 to 18 percent by weight water, the lecithin and water being present in amounts to provide a percent relative water content (calculated by dividing the weight of water in the composition by the sum of the weight of water plus phosphatides in the composition, and multiplying the result by 100), of from about 21 to 61 percent, e.g., from about 25 to 57 percent. The composition also contains from about 98.7 to 53 percent by weight edible oil, and from about 0.2 to 19 percent by weight of a humectant selected from one or more of glycerol, sorbitol and propylene glycol. Optionally, this composition may also contain one or more modifying agents. The foodstuffs parting composition is [dispersed] *dispensed* by a propellant which is present in an amount to provide a non-foaming, clear coating when the composition is sprayed onto the cooking surface of a utensil.

Column 4, lines 45–68 through column 5, lines 1–2:

In another aspect, the present invention also provides an aerosol-dispensable foodstuffs parting composition which is free of foam-suppressing quantities of monohydric aliphatic alcohols. This composition comprises from about 1 to 20 percent by weight of a lecithin component having a known phosphatide content, e.g., from about 4 to 15 percent by weight lecithin, optionally from about 0.2 to 17 percent by weight of a humectant selected from one or more of glycerol, sorbitol and propylene glycol, e.g., from about 1 to 9 percent by weight humectant, and water. The quantity of water in the composition is thus broadly, from about 0.2 to 22 percent by weight water. Preferably, the quantity of water is from about 0.3 to 18 percent water if the humectant is not present, and from about 0.1 to 11, e.g., *0.2 to 6*, percent by weight water if the humectant is present. In any case, the lecithin and water are present in amounts to provide a percent relative water content (calculated by dividing the weight of water in the composition by the sum of the weight of water plus phosphatides in the composition, and multiplying the result by 100), of from about 21 to 61 percent, e.g., from about 25 to 57 percent. The balance of the composition comprises an edible oil and from about 10 to 30 percent by weight of a pressurized, normally gaseous propellant suitable for discharging the composition as an aerosol spray.

AS A RESULT OF REEXAMINATION, IT HAS BEEN DETERMINED THAT:

Claim 21 is cancelled.

Claims 1, 2, 4–6, 8, 10, 12, 15, 17, 18, 20, 22 and 23 are determined to be patentable as amended.

Claims 3, 7, 9, 11, 13, 14, 16 and 19, dependent on an amended claim, are determined to be patentable.

New claims 24–35 are added and determined to be patentable.

1. An aerosol-dispensable foodstuffs parting composition [for-coating] *for coating* cooking surfaces *which* contains from zero to less than about [7.5] *1* percent by weight of monohydric aliphatic alcohols, is combined with a pressurized, normally gaseous propellant suitable for discharging the composition as an aerosol spray *and comprising one or more hydrocarbons*, and comprises lecithin and water both dispersed in an edible oil vehicle, the weight of the edible oil vehicle present in the composition exceeding the combined weight of the lecithin and the water present, the water being present in an amount which is sufficient to partially, but not fully, hydrate the lecithin to an extent that solubility of the lecithin in the edible oil is sufficiently reduced so that aerosol-dispensed coatings of the composition are rendered non-foaming and clear at ambient temperatures.

2. [The parting composition of claim 1 wherein the composition] *An aerosol-dispensable foodstuffs parting composition for coating cooking surfaces which is free of monohydric aliphatic alcohols and is combined with a pressurized, normally gaseous propellant suitable for discharging the composition as an aerosol spray, the composition comprising lecithin and water both dispersed in an edible oil vehicle, the weight of the edible oil vehicle present in the composition exceeding the combined weight of the lecithin and the water present, the water being present in an amount which is sufficient to partially, but not fully, hydrate the lecithin to an extent that solubility of the lecithin in the edible oil is sufficiently reduced so that aerosol-dispensed coatings of the compositions are rendered non-foaming and clear at ambient temperatures.*

4. The parting composition of claim 3 *or claim 24* wherein the percent relative water content is from about 25 to 57 percent RWC.

5. The parting composition of claim 1 *or claim 2* wherein the lecithin comprises from about 1 to 25 percent by weight of the composition.

6. The parting composition of [claim 1, 2, 3, 4 or 5] *claim 1 or claim 2* further comprising a humectant selected from the group consisting of one or more of glycerol, sorbitol and propylene glycol.

8. A foodstuffs parting composition [consisting essentially of] *for coating cooking surfaces comprises* from about 1 to 25 percent by weight lecithin having a known phosphatide content, from about 0.2 to 22 percent by weight water, *from zero to less than about 1 percent by weight of monohydric aliphatic alcohols,* and an edible oil vehicle *in which the lecithin and water are dispersed,* is combined with a pressurized, normally gaseous propellant comprising one or more hydrocarbons and being suitable for discharging the composition as an aerosol spray, the weight of the edible oil vehicle present in the composition exceeding the combined weight of the lecithin and water present, the lecithin and water being present in amounts sufficient (*i*) to partially, but not fully, hydrate the lecithin *to an extent that solubility of the lecithin in the edible oil is sufficiently reduced so that aerosol-dispensed coatings of the composition are rendered non-foaming and clear at ambient temperatures,* and (*ii*) to provide a percent relative water content ("percent RWC"), which is calculated by dividing the weight of water in the composition by the sum of the weight of water plus phosphatides in the composition, and multiplying the result by 100, of from 21 to 61 percent RWC[, so that aerosol-dispensed coatings of the composition are rendered non-foaming and clear at ambient temperatures].

10. A foodstuffs parting composition [comprises] *for coating cooking surfaces which contains from zero to less than about 1 percent by weight of monohydric aliphatic alcohols is combined with a pressurized, normally gaseous propellant comprising one or more hydrocarbons and suitable for discharging the composition as an aerosol spray, the composition comprising* from about 1 to 25 percent by weight lecithin having a known phosphatide content, from about 0.1 to 18 percent by weight water, *an edible oil vehicle present in the composition in a weight exceeding the combined weight of the lecithin and water present, and* from about 0.2 to 19 percent by weight of a humectant comprising glycerol, the humectant, lecithin and water being *dispersed in the edible oil vehicle and being* present in amounts sufficient to partially, but not fully, hydrate the lecithin *to an extent that solubility of the lecithin in the edible oil is sufficiently reduced so that aerosol-dispensed coatings of the composition are rendered non-foaming and clear at ambient temperatures,* and to provide a percent humectant plus water relative to phosphatide content ("percent HWP"), which is calculated by dividing the weight of water plus humectant in the composition by the sum of the weight of water plus humectant plus phosphatides in the composition, and multiplying the result by 100, of from about 21 to 61 percent HWP[, the composition further comprising an edible oil vehicle, the weight of the edible oil vehicle present in the composition exceeding the combined weight of the lecithin and water present, such that the aerosol-dispensed coatings of the composition are rendered non-foaming and clear at ambient temperatures].

12. An aerosol-dispensable foodstuffs parting composition *for coating cooking surfaces* which contains from zero to less than [7.5] *about 1* percent by weight of monohydric aliphatic alcohols and comprises: from about 1 to 20 percent by weight of a lecithin component having a known phosphatide content, from about 0.4 to 15 percent by weight of a humectant selected from the group consisting of one or more of glycerol, sorbitol and propylene glycol, [and] from about 0.1 to 11 percent by weight water, *and an edible oil vehicle in which the humectant, lecithin and water are dispersed, the weight of the edible oil vehicle present in the composition exceeding the combined weight of the lecithin and water;* the composition being combined with a pressurized, normally gaseous propellant comprising one or more hydrocarbons and being suitable for discharging the composition as an edible spray, *and* the lecithin and water being present in amounts sufficient (*i*) to partially, but not fully, hydrate the lecithin *to an extent that solubility of the lecithin in the edible oil is sufficiently reduced so that aerosol-dispensed coatings of the composition are rendered non-foaming and clear at ambient temperatures,* and (*ii*) to provide a percent humectant plus water relative to phosphatides content ("percent HWP"), which is calculated by dividing the weight of humectant plus water in the composition by the sum of the weight of humectant plus water plus phosphatides in the composition, and multiplying the result by 100, of from about 21 to 61 percent HWP[, the composition further comprising an edible oil vehicle, the weight of the edible oil vehicle present in the composition exceeding the combined weight of the lecithin and water, and a pressurized, normally gaseous propellant suitable for discharging the composition as an edible spray, such that the aerosol-dispensed coatings of the composition are rendered non-foaming and clear at ambient temperatures].

15. An aerosol-dispensable foodstuffs parting composition *for coating cooking surfaces* which contains from zero to less than [7.5] *about 1* percent by weight of monohydric aliphatic alcohols and comprises from about 1 to 20 percent by weight of a lecithin component having a known phosphatide content, [and] from about 0.2 to 22 percent by weight water, *and an edible oil vehicle in which the lecithin and water are dispersed, the weight of the edible oil vehicle present in the composition exceeding the combined weight of the lecithin and water;* the composition being combined with *a pressurized, normally gaseous propellant comprising one or more hydrocarbons and being suitable for discharging the composition as an edible spray, and* the lecithin and water being present in amounts to partially, but not fully, hydrate the lecithin *to an extent that solubility of the lecithin in the edible oil is sufficiently reduced so that aerosol-dispensed coatings of the composition are rendered non-foaming and clear at ambient temperatures,* and to provide a percent relative water content ("percent RWC"), which is calculated by dividing the weight of water in the composition by the sum of the weight of water plus phosphatides in the composition, and multiplying the result by 100, of from about 21 to 61 percent RWC[, the composition further comprising an edible oil vehicle, the weight of the edible oil vehicle present in the composition exceeding the combined weight of the lecithin and water present, and further comprising a pressurized, normally gaseous propellant suitable for discharging the composition as an edible spray, so that aerosol-dispensed coatings of the composition are rendered non-foaming and clear at ambient temperatures].

17. The parting composition of any one of [claim 5, 8,] *claims 10, 11, 12* or 13, wherein the lecithin component comprises from about 4 to 12 percent by weight, the humectant comprises from about 1 to 9 percent by weight, the water comprises from about 0.2 to 6 percent by weight, and the propellant comprises from about 10 to 75 percent by weight of the composition.

18. The parting composition of any one of claims 1, 2, 8, 10, 12, 15 or 16 further comprising a colloidal silica suspsending agent present in an amount effective to facilitate suspension of the lecithin in the edible oil.

20. The parting composition of claim 1, 2, 8 or 12 further comprising [a propellant and] one or more modifying agents.

22. The parting composition of [claim 21] *any one of claims 1, 2, 8, 10, 11, 12, 13, 15 or 16* wherein the pressurized, normally gaseous, propellant comprises from about 10 to 75 percent by weight of the composition.

23. The parting composition of any one of claims [18 through] *1, 2, 8, 10, 11, 12, 13, 15* or 16 wherein the lecithin component is selected from the group consisting of one or more of standard lecithin, acetylated lecithin and hydroxylated lecithin.

*24. The parting composition of claim 2 wherein the lecithin has a known phosphatide content and the lecithin and water are present in amounts to provide a percent relative water content ("percent RWC"), which is calculated by dividing the weight of water in the composition by the sum of the weight of water plus phosphatides in the composition, and multiplying the result by 100, of from about 21 to 61 percent RWC.*

*25. The parting composition of any one of claims 1, 2, 3 or 24 wherein the water is present in a quantity of from about 0.2 to 22 percent by weight of the composition.*

*26. The parting composition of claim 25 wherein the water is present in a quantity of from about 0.3 to 18 percent by weight of the composition.*

*27. The parting composition of claim 4 wherein the water is present in a quantity of from about 0.2 to 22 percent by weight of the composition.*

*28. The parting composition of clam 4 wherein the water is present in a quantity of from about 0.3 to 18 percent by weight of the composition.*

*29. The parting composition of claim 10 or claim 11 wherein the composition contains from zero to less than about 1 percent by weight of monohydric aliphatic alcohols.*

*30. The parting composition of claim 8, claim 15 or claim 16 wherein the composition is free of monohydric aliphatic alcohols.*

*31. The parting composition of claim 2 wherein the propellant comprises one or more hydrocarbons.*

*32. The parting composition of any one of claims 1, 2, 8, 12 and 15 wherein the lecithin and at least some of the edible oil and water are combined to form a material containing platelets of partially hydrated lecithin, and the size of the platelets thus formed is then reduced.*

*33. The parting composition of claim 32 wherein the size of the platelets is reduced by homogenizing the material containing the platelets by forcing the material at elevated pressure through the apertures of conventional homogenization equipment.*

*34. The parting composition of claim 5 wherein the water is present in a quantity of from about 0.2 to 22 percent by weight of the composition.*

*35. The parting composition of claim 2 wherein the propellant is selected from the group consisting of one or more hydrocarbons, dimethylether, carbon dioxide, nitrous oxide and normally gaseous fluorocarbons.*

* * * * *